United States Patent [19]

Hopkins et al.

[11] Patent Number: 5,699,536
[45] Date of Patent: Dec. 16, 1997

[54] COMPUTER PROCESSING SYSTEM EMPLOYING DYNAMIC INSTRUCTION FORMATTING

[75] Inventors: Martin Edward Hopkins, Chappaqua; Ravindra K. Nair, Briarcliff Manor, both of N.Y.

[73] Assignee: International Business Machines Corporation, Armonk, N.Y.

[21] Appl. No.: 421,272

[22] Filed: Apr. 13, 1995

[51] Int. Cl.⁶ .................................................. G06F 9/38
[52] U.S. Cl. ...................... 395/392; 395/379; 395/388; 395/389; 395/394; 395/386
[58] Field of Search .................................. 395/375, 800, 395/704, 709, 700, 379, 388, 389, 392, 393, 394, 395

[56] References Cited

U.S. PATENT DOCUMENTS

| | | | |
|---|---|---|---|
| 4,484,272 | 11/1984 | Green | 364/200 |
| 4,679,141 | 7/1987 | Pomerene et al. | |
| 4,811,214 | 3/1989 | Nosenchuck et al. | 395/800 |
| 4,903,196 | 2/1990 | Pomerene et al. | 364/200 |
| 4,992,938 | 2/1991 | Cocke et al. | |
| 5,016,163 | 5/1991 | Jesshope et al. | 364/200 |
| 5,021,945 | 6/1991 | Morrison et al. | 364/200 |
| 5,127,104 | 6/1992 | Dennis | 364/230 |
| 5,197,137 | 3/1993 | Kumar et al. | 395/375 |
| 5,297,281 | 3/1994 | Emma et al. | 395/392 |
| 5,299,321 | 3/1994 | Iizuka | |
| 5,347,639 | 9/1994 | Rechtschaffen et al. | 395/375 |
| 5,442,790 | 8/1995 | Nosenchuck | 395/707 |
| 5,450,556 | 9/1995 | Slavenburg et al. | 395/582 |
| 5,502,826 | 3/1996 | Vassiliadis et al. | 395/389 |

FOREIGN PATENT DOCUMENTS

| | | |
|---|---|---|
| 0 021 399 A1 | 6/1979 | European Pat. Off. .......... G06F 9/38 |
| 0 096 575 A2 | 6/1982 | European Pat. Off. .......... G06F 9/38 |
| 0 101 596 A3 | 8/1983 | European Pat. Off. .......... G06F 9/38 |
| 0 255 186 A2 | 7/1987 | European Pat. Off. .......... G06F 9/44 |
| 0523337 | 1/1993 | European Pat. Off. . |

OTHER PUBLICATIONS

R. Cohn, T. Gross, M. Lam and P.S. Tseng, "Architecture and Compiler Tradeoffs for a Long Instruction Word", pp. 2–14, Architectural Support for Progr. Lang., Operat. Systems, 3 Apr. 1989, Boston, MA (1989).

B. Ramakrishna Rau et al, "Instruction-Level Parallel Processing: History, Overview, and Perspective", J. of Supercomputing, 7, 9–50 (1993).

(List continued on next page.)

*Primary Examiner*—William M. Treat
*Assistant Examiner*—Gautam R. Patel
*Attorney, Agent, or Firm*—Jay P. Sberollini

[57] ABSTRACT

A computer processing apparatus includes a buffer called a decoded instruction buffer (DIB), which is used to store groups of commands representing instructions that can be executed in parallel. Each pattern in a DIB group may be an encoding of a long instruction termed a long decoded instruction (LDI). The DIB works in conjunction with a conventional computer processing apparatus consisting of a memory system, an instruction queue, and an instruction dispatch unit feeding into a set of execution units. When an instruction is not available in the DIB, this and subsequent instructions are fetched from the memory system into the instruction queue and executed in a conventional way.

Simultaneous with the execution of instructions by the conventional apparatus, a group formatter creates a set of LDIs, each of which is an alternate encoding of a set of the original instructions which can be executed in parallel. In constructing the LDIs, the group formatter analyzes the dependency between instructions and instruction latency. Each set of LDIs constructed by the group formatter is saved in the DIB so that the next execution of the same set of instructions can be executed directly from the DIB on the full complement of functional units and will not require the effort of dependency and latency analysis.

46 Claims, 23 Drawing Sheets

OTHER PUBLICATIONS

A. Nicolau et al. "Measuring the Parallelism Available for Very Long Instruction Word Architectures" Nov. 1984, IEEE Trans. on Computers, vol. c-33, #11.

M.E. Ebcioglu et al. "Method and Apparatus for Dynamic Conversion of Computer Instructions" S.N. 08/146,547, Filed Nov. 2, 1993 Group Art Unit: 2302, Preliminary Class: 395.

J.K.F. Lee et al. "Branch Prediction Strategies and Branch Target Buffer Design", Computer 17 (1984) Jan. #1, Long Beach, CA. pp. 6–22.

J.E. Requa et al., "The Piecewise Data Flow Architecture: Architectural Concepts", IEEE Trans. on Computers, vol. c-32 #5, May 1983.

G.F. Grohoski "Machine organization of the IBM RISC System/6000 Processor", IBM J. Res. Develop., vol. 34, #1, Jan. 1990, pp. 37–58.

J. Cocke et al. "The evolution of RISC technology at IBM", IBM J. Res. Develop., vol. 34, #1, Jan. 1990, pp. 4–36.

J.D. Johnson, "Expansion Caches for Superscalar Processors", Jun. 1994 Tech. Rpt. #CSL-TR-94-630 NASA.

M. Franklin et al., "A Fill–Unit Approach to Multiple Instruction Issue", MICRO 27, Nov. 1994 San Jose, CA. ACM 0-89791-808 pp. 162–170.

S.W. Melvin et al, "Hardware Support for Large Atomic Units in Dynamically Scheduled Machines", 1988 IEEE pp. 60–63.

T. R. Halfhill, "INTEL'S P6" Apr. 1995, BYTE pp. 42–58.

R.J. Eickemeyer et al, "Interlock Collapsing ALU for Increased Instruction–Level Paralellism", Proc. 25th Annual International Sym. on Microarchitecture MICRO 25, IEEE Dec. 1992 pp. 149–157.

H.S. Stone, "High Performance Computer Architecture", Addison–Wesley Publishing Co., 1987, pp. 29–39.

ENTRY FORMAT OF DIB

| GID | GRP | U |
|---|---|---|

FIG.3

FORMAT OF CGB

| | | | | | | |
|---|---|---|---|---|---|---|
| $LDI_3$ | $FU0_3$ | $FU1_3$ | $FU2_3$ | $FU3_3$ | $BP0_3$ | $BP1_3$ |
| $LDI_2$ | $FU0_2$ | $FU1_2$ | $FU2_2$ | $FU3_2$ | $BP0_2$ | $BP1_2$ |
| $LDI_1$ | $FU0_1$ | $FU1_1$ | $FU2_1$ | $FU3_1$ | $BP0_1$ | $BP1_1$ |
| $LDI_0$ | $FU0_0$ | $FU1_0$ | $FU2_0$ | $FU3_0$ | $BP0_0$ | $BP1_0$ |

FIG.4

| INSTRUCTION | DEPENDENT ON |
|---|---|
| a | |
| b | |
| c | a,b |
| d | a,c |
| e | — |
| f | e |
| g | e,f |
| h | b,f |
| i | d,g |
| j | i |
| k | — |
| l | k |
| m | c,k |
| n | — |
| o | n |
| p | e |
| bcx | a |
| bcy | e |

FIG.8

| | | |
|:---:|:---:|:---:|
| a | a | a |
| b | b | b |
| c | c | c |
| bcx (0) | bcx (1) | bcx (0) |
| d | k | d |
| e | l | e |
| f | m | f |
| g | n | g |
| bcy (1) | o | bcy (0) |
| h | | p |
| i | | i |
| j | | j |
| FIG.9A | FIG.9B | FIG.9C |

|      | FU0 | FU1 | FU2 | FU3 | BP0 | BP1 |
|------|-----|-----|-----|-----|-----|-----|
| LDI0 | a   |     |     |     |     |     |
| LDI1 |     |     |     |     |     |     |
| LDI2 |     |     |     |     |     |     |
| LDI3 |     |     |     |     |     |     |

AFTER a

|      | FU0 | FU1 | FU2 | FU3 | BP0 | BP1 |
|------|-----|-----|-----|-----|-----|-----|
| LDI0 | a   | b   |     |     |     |     |
| LDI1 |     |     |     |     |     |     |
| LDI2 |     |     |     |     |     |     |
| LDI3 |     |     |     |     |     |     |

AFTER b

|      | FU0 | FU1 | FU2 | FU3 | BP0 | BP1 |
|------|-----|-----|-----|-----|-----|-----|
| LDI0 | a   | b   |     |     |     |     |
| LDI1 | c   |     |     |     |     |     |
| LDI2 |     |     |     |     |     |     |
| LDI3 |     |     |     |     |     |     |

AFTER c

|      | FU0 | FU1    | FU2 | FU3 | BP0 | BP1     |
|------|-----|--------|-----|-----|-----|---------|
| LDI0 | a   | b      |     |     |     |         |
| LDI1 | c   |        |     |     | LK  | (x=1)   |
| LDI2 | d   |        |     |     |     |         |
| LDI3 |     | (x=0)  |     |     |     |         |

AFTER bcx & d

|      | FU0 | FU1    | FU2    | FU3 | BP0 | BP1   |
|------|-----|--------|--------|-----|-----|-------|
| LDI0 | a   | b      | e      |     |     |       |
| LDI1 | c   | f      | (x=0)  |     | LK  | (x=1) |
| LDI2 | d   | g      |        |     |     |       |
| LDI3 |     | (x=0)  |        |     |     |       |

AFTER g

|      | FU0 | FU1    | FU2    | FU3    | BP0 | BP1   |
|------|-----|--------|--------|--------|-----|-------|
| LDI0 | a   | b      | e      |        |     |       |
| LDI1 | c   | f      | (x=0)  |        | LK  | (x=1) |
| LDI2 | d   | g      |        | (x=0)  | LP  | (y=0) |
| LDI3 |     | (x=0)  | h      | (y=1)  |     |       |

AFTER bcy

|      | FU0 | FU1    | FU2   | FU3    | BP0 | BP1   |
|------|-----|--------|-------|--------|-----|-------|
| LDI0 | a   | b      | e     | (x=0)  |     | (x=1) |
| LDI1 | c   | f      |       |        | LK  |       |
| LDI2 | d   | g      | h     | (x=0)  | LP  | (y=0) |
| LDI3 | i   |        |       | (y=1)  | LJ  |       |
|      | (x=0)(y=1) | (x=0) |       |        |     |       |

AFTER i (full)

FIG. 10A

|       | FU0 | FU1 | FU2 | FU3 | BP0 | BP1 |
|-------|-----|-----|-----|-----|-----|-----|
| LDI0  | a   | b   | k (x=1) | n (x=1) |     |     |
| LDI1  | c   | l (x=1) | o (x=1) |     | LD= (x=0) |     |
| LDI2  | m (x=1) |     |     |     |     |     |
| LDI3  |     |     |     |     |     |     |

AFTER 0 (NOT YET FULL)

FIG. 10B

|       | FU0 | FU1 | FU2 | FU3 | BP0 | BP1 |
|-------|-----|-----|-----|-----|-----|-----|
| LDI0  | a   | b   | e (x=0) |     |     |     |
| LDI1  | c   | f (x=0) | p (x=0)(Y=0) |     | LK= (x=1) |     |
| LDI2  | d (x=0) | g (x=0) |     |     | LH= (Y=1) |     |
| LDI3  | i (x=0)(Y=0) |     |     |     | LJ= (x=0)(Y=0) |     |

AFTER 1 (FULL)

FIG. 10C

| INSTRUCTION | USES | DEFINES | SECTION OF TST | | | | | |
|---|---|---|---|---|---|---|---|---|
| | | | r1 | r2 | r3 | r4 | r5 | ... |
| START OF GROUP | | | 0 | 0 | 0 | 0 | 0 | ... |
| INSTR. 1 | r2,r3 | r1 | 1 | 0 | 0 | 0 | 0 | ... |
| INSTR. 2 | r1,r5 | r4 | 1 | 0 | 0 | 2 | 0 | ... |
| INSTR. 3 | r1,r4 | r3 | 1 | 0 | 3 | 2 | 0 | ... |
| INSTR. 4 | r2,r5 | r4 | 1 | 0 | 3 | 3 | 0 | ... |
| INSTR. 5 | r4 | r4 | 1 | 0 | 3 | 4 | 0 | ... |

FIG.14A

| | FU0 | FU1 | FU2 | FU3 | BP0 | BP1 |
|---|---|---|---|---|---|---|
| LDI0 | INSTR. 1 | | | | | |
| LDI1 | INSTR. 2 | | | | | |
| LDI2 | INSTR. 3 | INSTR. 4 | | | | |
| LDI3 | INSTR. 5 | | | | | |

FIG.14B

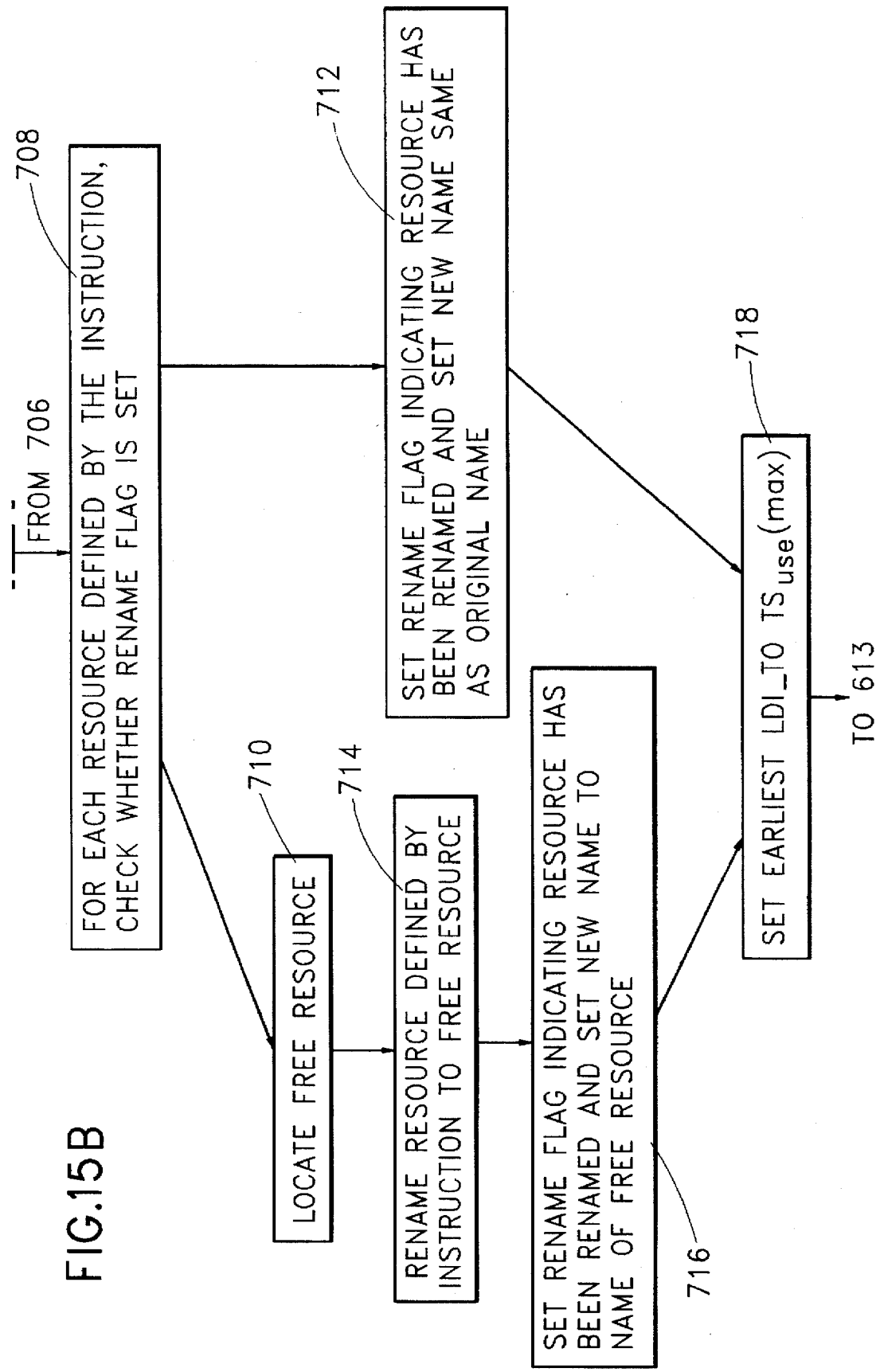

FIG.16A

| INSTRUCTION | USES | DEFINES | SECTION OF TST ||||||||
|---|---|---|---|---|---|---|---|---|---|
| | | | r1 | r2 | r3 | r4 | r5 | .. | rN |
| START OF GROUP | | | 0 | 0 | 0 | 0 | 0 | .. | 0 |
| INSTR. 1 | r2,r3 | r1 | 1 | 0 | 0 | 0 | 0 | .. | 0 |
| INSTR. 2 | r1,r5 | r4 | 1 | 0 | 0 | 0 | 0 | .. | 0 |
| INSTR. 3 | r1,r4 | r3 | 1 | 0 | 0 | 2 | 0 | .. | 0 |
| INSTR. 4 | r2,r5 | r4 → rN | 1 | 0 | 3 | 2 | 0 | .. | 1 |
| INSTR. 5 | r4 → rN | r4 → rN | 1 | 0 | 3 | 2 | 0 | .. | 2 |
| INSTR. 6 | r3, r4 → rN | r3 | 1 | 0 | 4 | 2 | 0 | .. | 2 |

FIG.16B

| | FU0 | FU1 | FU2 | FU3 | BP0 | BP1 |
|---|---|---|---|---|---|---|
| LDI0 | INSTR. 1 | INSTR. 4 | | | | |
| LDI1 | INSTR. 2 | INSTR. 5 | | | | |
| LDI2 | INSTR. 3 | | | | | |
| LDI3 | INSTR. 6 | | | | | |

FIG. 18A

| INSTRUCTION | USES | DEFINES | SECTION OF TST ||||||||
| --- | --- | --- | --- | --- | --- | --- | --- | --- | --- | --- |
| | | | r2 | r3 | r6 | r7 | r9 | r10 | ML | MS |
| START OF GROUP | | | 0 | 0 | 0 | 0 | 0 | 0 | 0 | 0 |
| INSTR. 1 | r7,r10 ML,MS | MS | 0 | 0 | 0 | 0 | 0 | 0 | 0 | 1 |
| INSTR. 2 | r3,r4 | r2 | 1 | 0 | 0 | 0 | 0 | 0 | 0 | 1 |
| INSTR. 3 | r2,MS | r3,ML | 1 | 2 | 0 | 0 | 0 | 0 | 2 | 1 |
| INSTR. 4 | r6,MS | r9,ML | 1 | 2 | 0 | 0 | 3 | 0 | 3 | 1 |
| INSTR. 5 | r2,r9, ML,MS | MS | 0 | 2 | 0 | 0 | 3 | 0 | 3 | 4 |

FIG. 18B

| | FU0 | FU1 | FU2 | FU3 | BP0 | BP1 |
| --- | --- | --- | --- | --- | --- | --- |
| LDI0 | INSTR. 1 | INSTR. 2 | | | | |
| LDI1 | INSTR. 3 | | | | | |
| LDI2 | INSTR. 4 | | | | | |
| LDI3 | INSTR. 5 | | | | | |

FIG. 18C

| INSTRUCTION | USES | DEFINES | SECTION OF TST ||||||||
|---|---|---|---|---|---|---|---|---|---|---|
| | | | r2 | r3 | r6 | r7 | r9 | r10 | ML | MS |
| START OF GROUP | | | 0 | 0 | 0 | 0 | 0 | 0 | 0 | 0 |
| INSTR. 1 | r7,r10 ML,MS | MS | 0 | 0 | 0 | 0 | 0 | 0 | 0 | 1 |
| INSTR. 2 | r3,r4 | r2 | 1 | 0 | 0 | 0 | 0 | 0 | 0 | 1 |
| INSTR. 3 | r2,MS | r3,ML | 1 | 2 | 0 | 0 | 0 | 0 | 0 | 1 |
| INSTR. 4 | r6,MS | r9,ML | 1 | 2 | 0 | 0 | 0 | 0 | 2 | 1 |
| INSTR. 5 | r2,r9, ML,MS | MS | 0 | 2 | 2 | 0 | 2 | 0 | 2 | 3 |

FIG. 18D

| | FU0 | FU1 | FU2 | FU3 | BP0 | BP1 |
|---|---|---|---|---|---|---|
| LDI0 | INSTR. 1 | INSTR. 2 | | | | |
| LDI1 | INSTR. 3 | INSTR. 4 | | | | |
| LDI2 | INSTR. 5 | | | | | |
| LDI3 | | | | | | |

BRANCH OUT

| | FU0 | FU1 | FU2 | FU3 | BP0 | BP1 |
|---|---|---|---|---|---|---|
| LDI0 | a | b | e (x=0) | | | |
| LDI1 | c | f (x=0) | | | LK: (x=1) | |
| LDI2 | d (x=0) | g (x=0) | h (x=0)(y=1) | | LP: (y=0) | |
| LDI3 | i (x=0)(y=1) | | | | LJ: (x=0)(y=1) | |

AFTER K

| | FU0 | FU1 | FU2 | FU3 | BP0 | BP1 |
|---|---|---|---|---|---|---|
| LDI0 | a | b | e (x=0) | k (x=1) | | |
| LDI1 | c | f (x=0) | | | | |
| LDI2 | d (x=0) | g (x=0) | h (x=0)(y=1) | | LP: (y=0) | |
| LDI3 | i (x=0)(y=1) | | | | LJ (x=0)(y=1) | |

AFTER L

| | FU0 | FU1 | FU2 | FU3 | BP0 | BP1 |
|---|---|---|---|---|---|---|
| LDI0 | a | b | e (x=0) | k (x=1) | | |
| LDI1 | c | f (x=0) | l (x=1) | | | |
| LDI2 | d (x=0) | g (x=0) | h (x=0)(y=1) | | LP: (y=0) | |
| LDI3 | i (x=0)(y=1) | | | | LJ (x=0)(y=1) | |

FIG. 19A

| | FU0 | FU1 | FU2 | FU3 | BP0 | BP1 |
|---|---|---|---|---|---|---|
| LDI0 | a | b | e (x=0) | k (x=1) | | |
| LDI1 | c | f (x=0) | l (x=1) | m (x=1) | | |
| LDI2 | d (x=0) | g (x=0) | h (x=0)(y=1) | n (x=1) | LP: (y=0) | |
| LDI3 | i (x=0)(y=1) | | | | LJ (x=0)(y=1) | |

AFTER n

| | FU0 | FU1 | FU2 | FU3 | BP0 | BP1 |
|---|---|---|---|---|---|---|
| LDI0 | a | b | e (x=0) | k (x=1) | | |
| LDI1 | c | f (x=0) | l (x=1) | m (x=1) | | |
| LDI2 | d (x=0) | g (x=0) | h (x=0)(y=1) | n (x=1) | LP: (y=0) | |
| LDI3 | i (x=0)(y=1) | o (x=1) | | | LJ (x=0)(y=1) | |

AFTER o

FIG. 19B

COMPUTER PROCESSING SYSTEM EMPLOYING DYNAMIC INSTRUCTION FORMATTING

BACKGROUND OF THE INVENTION

1. Technical Field

This invention relates generally to a data processing system and, more particularly, to the execution of instructions stored in external memory by the data processing system.

2. Description of the Related Art

Computer architectures are generally based on a sequential model of program execution, wherein each instruction in a program is fetched from memory, fully executed, and all results returned to memory before the next instruction is similarly dealt with. In this model, the next instruction executed is usually the one immediately following the one just executed, stored in a location in memory that has the next higher address with respect to the one just executed. A location different from the next successive location may be specified in branch instructions, which occur with some frequency in typical computer program applications.

In simple implementations of this sequential model, each instruction is treated identically and predictably. Thus, the time required for execution of a set of instructions is exactly proportional to the number of instructions executed. In pipelined or overlapped implementations, where one instruction is fetched while the previous one is still being executed, no delay is encountered as long as there are no dependencies among the instructions currently being executed. A dependency is encountered when one instruction cannot complete execution until the results of another are available. In such a situation the second instruction must wait until the first one has generated its results, leading to delays in execution.

Various methods are used to reduce delays due to dependencies in pipelined implementations. In a first approach, the details of the implementation are input to a compiler that schedules instructions such that dependent instructions are not available for execution at exactly the same time. This requires that the compiler take care of all dependencies and has the advantage of keeping implementations simple. Because results are always scheduled to be available in time, the only limitation to the speed of the system, as measured by the cycle time of its internal clock, is the complexity of a single primitive arithmetic or logical operation in the instruction set. The disadvantage of this approach is that the complied application is only compatible with the specific implementation, thus requiring recompilation and end user repurchase for all pre-existing computer program applications to run on the specific implementation.

A second approach is for the processor to include hardware that checks for dependencies among instructions and schedules them carefully so that instructions access data only after the instructions generating them have done so. In addition to the complexity of a primitive operation, the second approach is also limited by the complexity of discovering dependence between instructions, which increases as the number of overlapping operations that can be executed increases. This has the effect of either increasing the cycle time of the internal clock of the system, or of increasing the number of clock cycles required to complete execution of the program, both of which degrade the performance of the system. This scheme however has the important advantage of being able to execute a single compiled program on different implementations.

SUMMARY OF THE INVENTION

It is an object of this invention to improve the overall system performance of a data processing system.

It is another object of the present invention to improve the rate at which instructions are executed by a processor.

It is yet another object of the present invention to minimize the work required in discovering dependencies in an instruction stream.

It is yet another object of the present invention to enable a processor to dynamically learn about the operations of a stream of instructions that it can execute in parallel.

It is yet another object of the present invention to enable a processor to learn about multiple streams of instructions that it can execute in parallel.

In this invention, a buffer called a decoded instruction buffer (DIB), is used to store groups of commands representing instructions that can be executed in parallel. Each pattern in a DIB group may be an encoding of a long instruction termed a long decoded instruction (LDI). Each LDI may include all the information necessary to execute the instruction, including, for example, the functional unit and register resources used in executing the instruction. The LDIs may also contain a set of pointers to the next group and/or the next LDI to be executed depending on the outcome of the current instruction.

The DIB works in conjunction with a conventional computer processing apparatus consisting of a memory system, an instruction queue, and an instruction dispatch unit feeding into a set of execution units. When an instruction is not available in the DIB, this and subsequent instructions are fetched from the memory system into the instruction queue and executed in a conventional way, involving either a subset of available functional units, or functional units dedicated to this purpose. Simultaneous with the execution of instructions by the conventional apparatus, a group formatter creates a set of LDIs, each of which is an alternate encoding of a set of the original instructions which can be executed in parallel. In constructing the LDIs, the group formatter analyzes the dependency between instructions and instruction latency. Each set of LDIs constructed by the group formatter is saved in the DIB so that the next execution of the same set of instructions can be executed directly from the DIB on the full complement of functional units and will not require the effort of dependency and latency analysis.

The DIB may be organized as a cache indexed by an instruction identifier, for example, the address of the instruction in the original instruction stream. In its simplest form, it may be arranged as a memory and accessed using an appropriate set of bits from the address. In this case, the full address is stored along with the contents, or in a parallel memory, and compared with the required address to validate the group. In parallel with this access, the memory system is also accessed, so that if there is a mismatch in the DIB, execution can resume without delay from the memory system.

BRIEF DESCRIPTION OF THE DRAWINGS

FIG. 3 illustrates an entry format of the Decoded Instruction Buffer of FIG. 2;

FIG. 4 illustrates an entry format of the Current Group Buffer if FIG. 2;

FIG. 8 is a table illustrating the dependency between instructions for the program sequence of FIG. 7;

FIG. 9(A) illustrates an executable path through the program sequence of FIG. 7 wherein the branch instruction bcx takes a path corresponding to x=0 and the branch instruction bcy takes a path corresponding to y=1; FIG. 9(B) illustates an executable path through the program sequence of FIG. 7 wherein the branch instuction bcx takes a path corresponding to x=1; and FIG. 9(C) illustrates an executable path through the program sequence of FIG. 7 wherein the branch instuction bcx takes a path corresponding to X=0 and the branch instruction bcy takes a path corresponding to y=0.

FIG. 10(A) illustrate the operation of the group formatter of FIG. 1 in processing the program sequence of FIG. 9(A); FIG. 10(B) illustrate the operation of the group formatter of FIG. 1 in processing the program sequence of FIG. 9(B); and FIG. 10(C) illustrate the operation of the group formatter of FIG. 1 in processing the program sequence of FIG. 9(C).

FIGS. 14(A)-(B) illustrate the state of the time stamp table and group buffer of FIG. 11 as the allocator builds a group of LDIs in the group buffer;

FIGS. 16(A)-(B) illustrate the state of the time stamp table and group buffer of FIG. 11 as the allocator builds a group of LDIs in the group buffer utilizing register renaming techniques;

FIGS. 18(A) and (B) illustrate the state of the time stamp table and group buffer, respectively, as the allocator processes a first exemplary instruction according to the operations shown in FIG. 17; FIGS. 18(C) and (D) illustrate the state of the time stamp table and group buffer, respectively, as the allocator processes a second exemplary instruction according to the operations shown in FIG. 17.

FIG. 19 illustrates the operation of the group formatter of FIG. 1 in modifying a group according to the execution results of the group generated by the parallel engine of FIG. 1.

DETAILED DESCRIPTION OF THE PRESENT INVENTION

Figure 1:
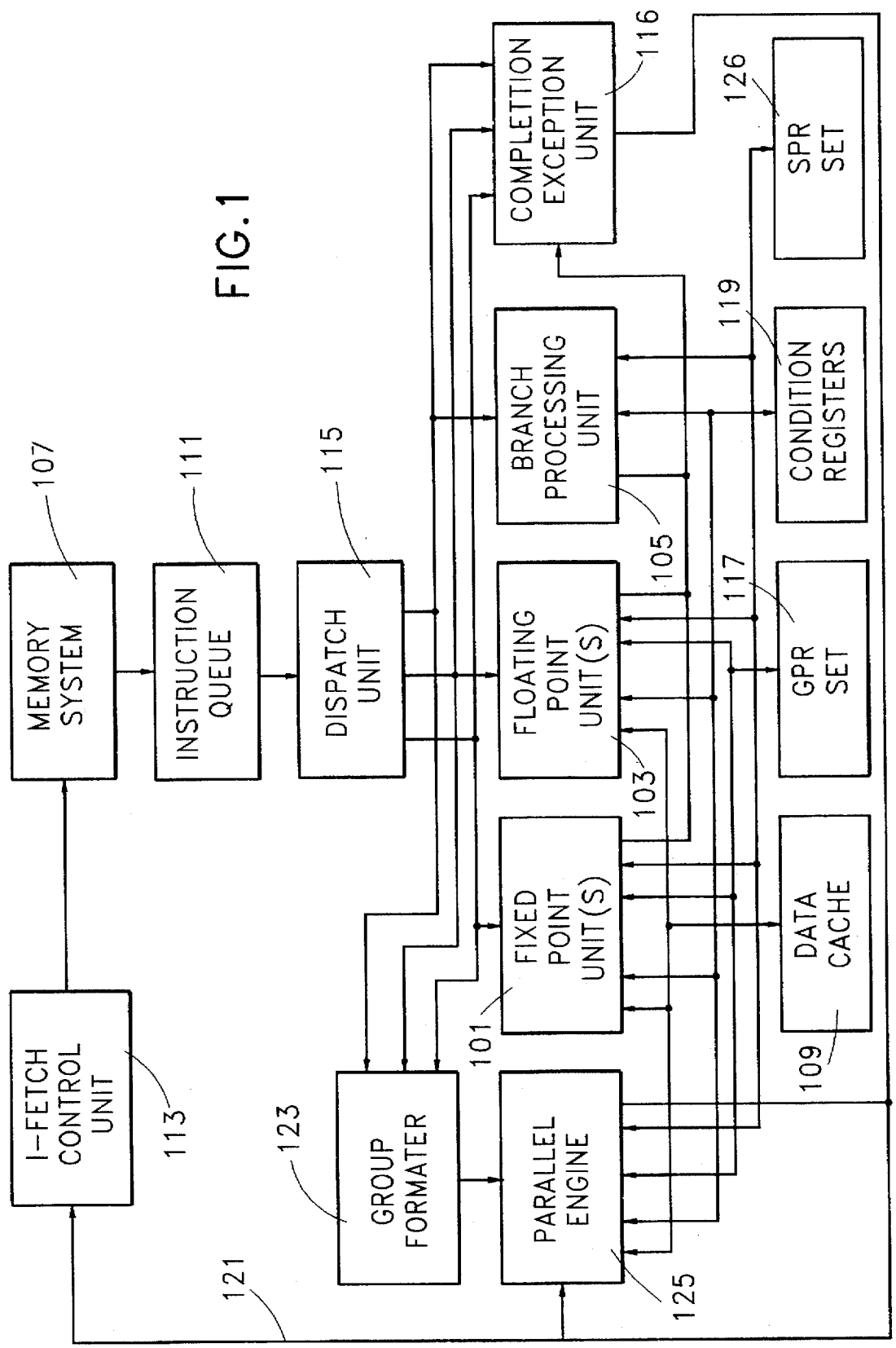
FIG. 1 illustrates the organization of the computer processing apparatus according to the present invention.

With reference to FIG. 1, the computer processing apparatus of the present invention includes a conventional sequential machine having one or more fixed point execution units 101 (one shown), one or more floating point execution units 103 (one shown), and one or more branch processing units 105 (one shown). A memory system 107 stores instructions to be executed by the execution units 101,103,105. A data cache 109 stores data associated with the instructions executed by the fixed point and floating point execution units 103,105. As is conventional, the memory system 107 may include a main memory and a cache memory subsystem. Typically, the data cache 109 and the cache memory subsystem are set associative structures. The data cache 109 may be a separate structure from the cache memory subsystem of the memory system 107 (commonly called a split cache), or in the alternative may be part of the cache memory subsystem of the memory system 107 (commonly called a combined cache).

An instruction queue 111 is connected to receive instructions fetched from the memory system 107. Instructions may be fetched from the memory system 107 individually or in a group commonly called a block. Fetching blocks of instructions is preferable in cache systems because it provides greater cache access for operands. In current practice, a block is typically a quadword (Qw-16 bytes) or eight words (32 bytes), but in future machines the block size may be larger. Moreover, instructions may or may not be aligned on block boundaries.

The fetching of instructions from the memory system 107 into the instruction queue 111 is coordinated by an instruction fetch control unit 113. The functions of the instruction fetch control unit 113 may include address generation and translation of instruction fetch addresses. The primary function of the instruction fetch control unit 113 is loading into an I-FETCH address register (not shown) the address that identifies the block of instructions to be fetched from the memory system 107 into the instruction queue 111. The instruction fetch control unit 113 may also include prefetch logic that controls the speculative prefetch of instructions from the memory system 107 into the instruction queue 111. Typically, such prefetch logic includes a branch history table and associative control logic. A more detailed description of an example of such prefetch logic may be found in Pomerene et al., U.S. Pat. No. 4,679,141, which is commonly assigned to the assignee of the present invention and herein incorporated by reference in its entirety.

A dispatch unit 115 loads instructions from the instruction queue 111, decodes the instructions and schedules the decoded instructions for execution by the appropriate execution units 101,103 and 105. The results of the instructions executed by the fixed point and floating point execution units 101 and 103 are supplied to a general purpose register set 117 for update. The results of branch instructions executed by the branch processing unit 105 are supplied to condition registers 119 for update. The fixed and floating point execution units 101,103 and the branch processing unit 105 access a special purpose register (SPR) set 120 as is conventional. The SPR set 120 may include, for example, a link register, a counter register, and a fixed point exception register.

A completion/exception unit 116 tracks instructions from dispatch through execution, and then retires the instruction in program order. Moreover, the completion/exception unit 116 includes a program counter (not shown) that stores the address of the next instruction in the instruction stream and outputs the address to the instruction fetch control unit 113 via the NEXT_IADDR bus 121.

The logic which operates the conventional sequential machine is largely similar to the logic described in Grohoski, G. F., "Machine Organization of the IBM RISC System/ 6000 Processor," IBM Journal of Research and Development, vol. 34, no. 1, January 1990, pp. 37–58. Generally, the address presented by the instruction fetch control unit 113 to the memory system 107 is used to access a set of contiguous instructions and fetch them into the instruction queue 111. In the next cycle, the dispatch unit 115 loads one or more instructions from the bottom of the instruction queue 111, decodes the instructions, and schedules the decoded instructions for execution by the appropriate execution unit 101,103,105. For example, the dispatch unit 115 may schedule a fixed point instruction to the fixed point unit 101, a floating point instruction to the floating point unit 103, and a branch instruction to the branch processing unit 105. Moreover, if none of the decoded instructions are branch instructions, the remaining instructions in the instruction queue 111 may be scanned for a branch instruction, and if a branch instruction is found, then in the current cycle the branch instruction is also scheduled for execution by the branch processing unit 105.

In the next cycle, the scheduled instructions sent from the dispatch unit 115 are executed. In this same cycle, the completion/exception unit 116 reorders the result of completed instructions and presents the address of the next instruction to the instruction fetch unit 113 via the NEXT_IADDR bus 121.

In addition, the dispatch unit 115 of the sequential machine may translate certain decoded instructions into one or more instructions that have a different format than the original instruction before scheduling the translated instructions for execution by the execution units 101,103,105. For example, the dispatch unit 115 may translate certain complex (for example, CISC-type) instructions into one or more less complex (for example, RISC-type) instructions and then schedule the instructions for execution by the execution units 101,103,105.

As described above, the conventional sequential machine is capable of executing a maximum of one fixed point operation, one floating point operation, and one branch operation per cycle as long as the block of instructions containing the desired instruction and associated data is present in the cache subsystem of the memory system 107, and as long as the branch processing unit 105 does not waste cycles waiting for a result to be generated by the fixed point and/or floating point execution elements 101,103.

According to the present invention, concurrently with the dispatch of one or more instructions to the execution units 101,103,105, the dispatched instructions are supplied to a group formatter 123 for analysis. Concurrent with the execution of the instructions and/or subsequent to the execution of the instructions, the group formatter 123 analyzes the instructions for dependencies and instruction latency, generates groups of long decoded instructions (LDIs) according to the analysis, and saves the groups of LDIs as entries in a decode instruction buffer (DIB) of a parallel engine 125. Each group represents a sequence $S_G$ of the original instruction stream stored in the memory system 107. Each LDI of a particular group represents an alternate encoding of a sub-sequence $S_L$ (of the sequence $S_G$ of the original instruction stream) that can be executed in parallel in a single machine cycle. The groups of LDIs constructed by the group formatter 123 are saved in the DIB of the parallel engine 125 so that the next execution of the same sequence $S_G$ of instructions can be executed in parallel by the functional units of the parallel engine 125. The implementation of the group formatter and parallel engine as described below may be pipelined to provide for improved throughput.

Importantly, the group formatter 123 arranges the LDIs in groups to provide for out-of-order execution of the instructions within the group, thus maximizing the efficiency of the parallel engine 125. Moreover, note that the group formatter 123 does not simply translate the instructions stored in the memory system 107 such that there is a one-to-one correspondence between these instructions and the alternate encodings stored in the DIB. In fact, the group formatter 123 analyzes dispatched instructions for dependencies and instruction latency with respect to the preceding dispatched instructions, and derives the alternate encodings according to this analysis. Because the analysis performed by the group formatter is "context dependent" (i.e., dependent upon the control flow and operational constraints of preceding instructions), the group formatter may derive multiple alternate encodings that pertain to a particular instruction stored in the memory system 107. For example, consider two instruction sequences stored in the memory system 107. The first instruction sequence includes the instructions at locations A,B,X,Y in the memory system 107. The second instruction sequence includes instructions at locations A,C,Y in the memory system 107. In this example, the group formatter 123 may generate an alternate encoding that pertains to each sequence. However, both of these alternate encodings generated by the group formatter 123 relate to instructions A and Y. A more detailed description of the group formatter 123 is presented below.

Figure 2:
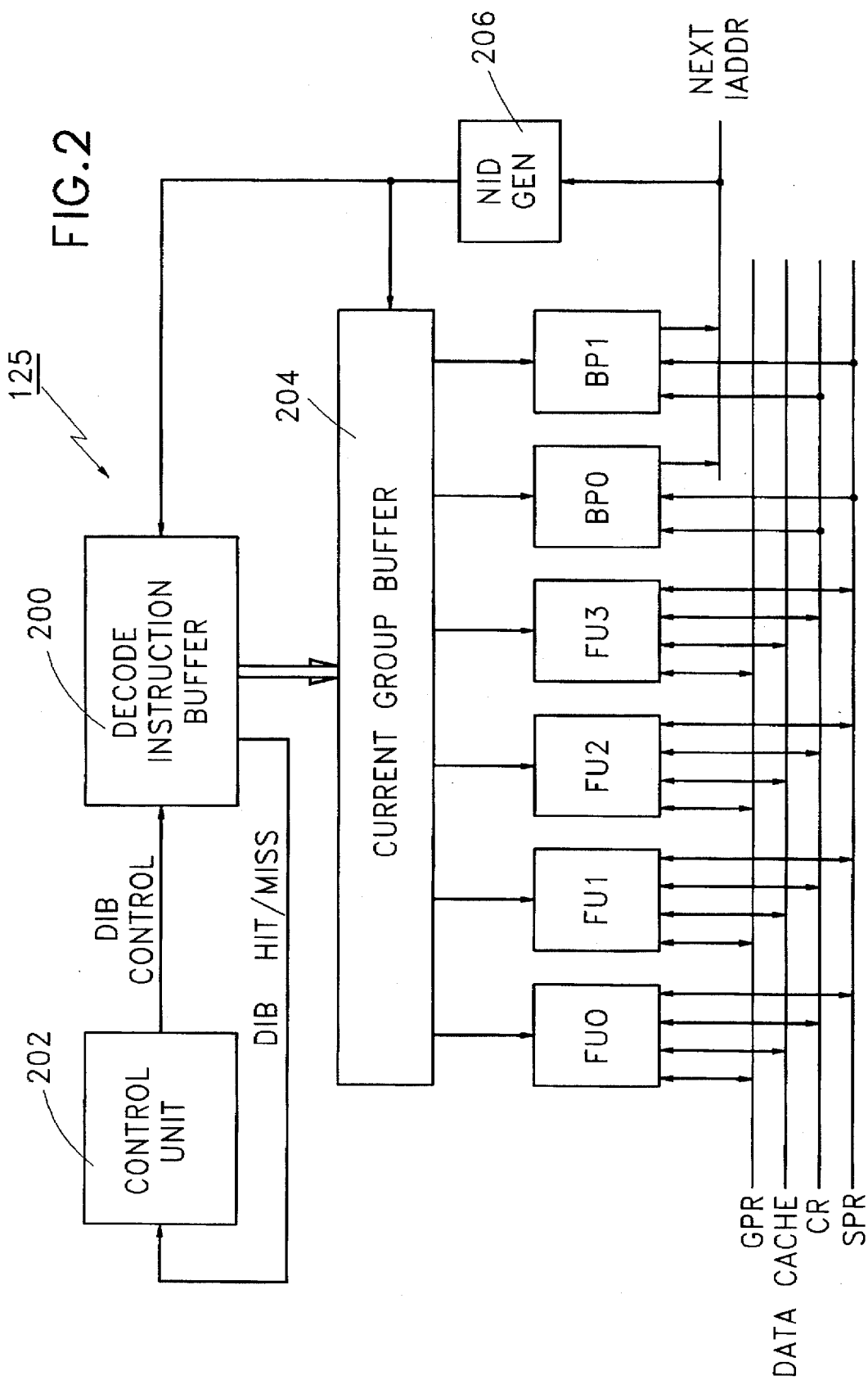
FIG. 2 illustrates the organization of the parallel engine of FIG. 1.

As shown in FIG. 2, the parallel engine 125 includes a current group buffer (CGB) 204 and a plurality of execution units that are capable of executing the alternate encoded instructions stored in the CGB 204. The execution units of the parallel engine 125 may be symmetric, thus capable of performing any one of a fixed point, floating point, and branch operation. In the alternative, the execution units of the parallel engine 125 may be asymmetric. For example, as shown in FIG. 2, the parallel engine 125 includes four functional units FU0 . . . FU3 and two branch processing units BP0 . . . BP1 as shown. The functional units may be fixed point execution units and/or floating point execution units. In this case, each functional unit has a path to and from the general purpose register set 117 via the GPR_Bus, to and from the data cache 109 via the data_cache bus, to and from the condition registers 119 via the CR bus, and to and from the SPR set 120 via the SPR_bus. Moreover, the execution units of the parallel engine 125 that perform fixed point operations may be capable of computing and translating addresses and communicating with the data cache. A more detailed description of an example of the execution units of the parallel engine 125 may be found in U.S. application Ser. No. (Attorney Docket No. AT 992-097) in the name of Ebcioglu and Groves, commonly assigned to the assignee of the present invention and herein incorporated by reference in its entirety. Furthermore, if the format of instructions encoded by LDIs stored in the CGB 204 are compatible with one or more of the execution units of the sequential machine, the compatible instructions may be executed on the execution units of the sequential machine, thus allowing the parallel engine 125 and sequential machine to share execution units.

Figure 5:
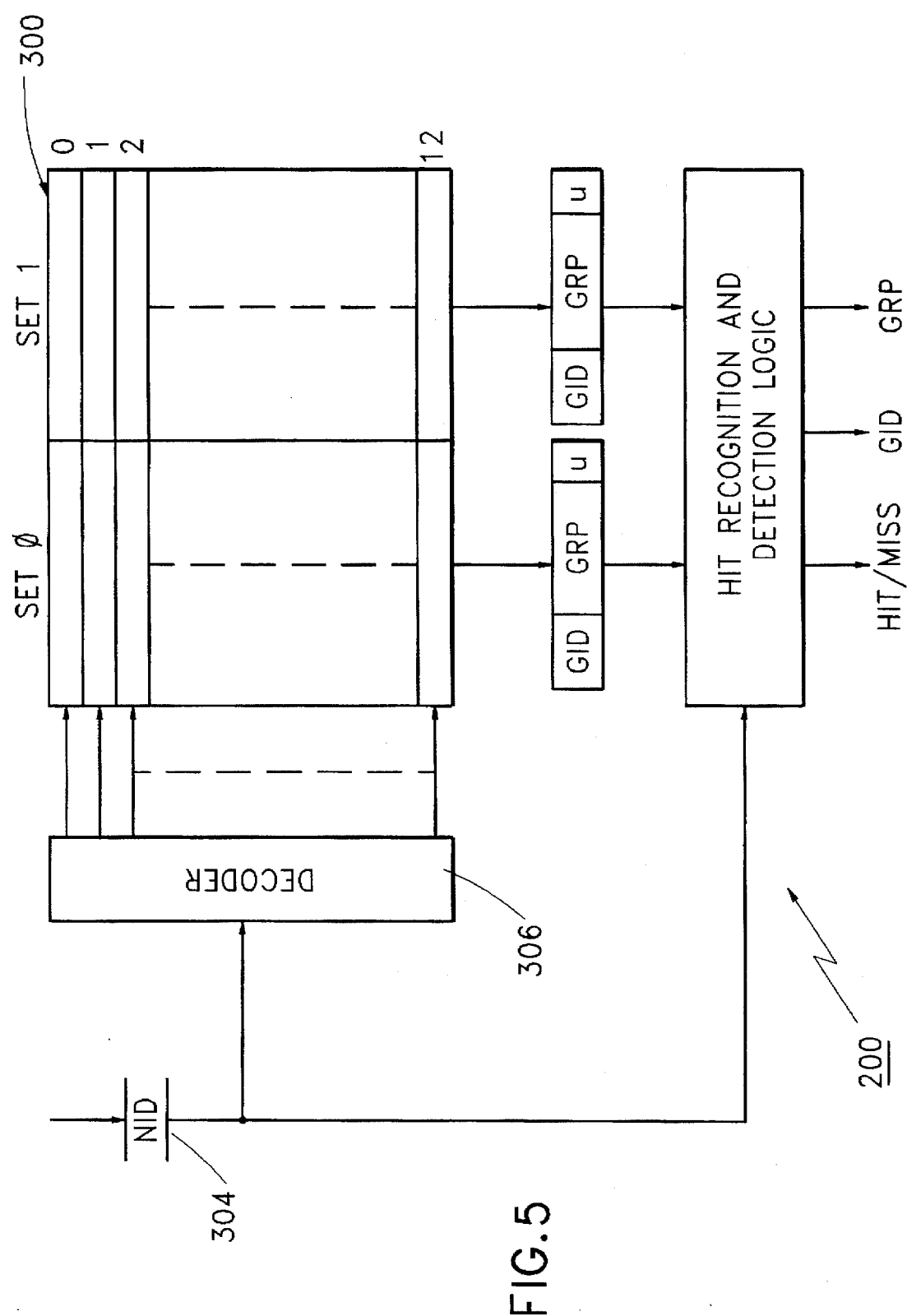
FIG. 5 is a functional block diagram of the Decoded Instruction Buffer of FIG. 2.

Generally, the DIB 200 may be arranged like a cache as an array of entries, wherein each entry includes a group identifier (GID) and group instruction data (GRP) as illustrated in FIG. 3. The group identifier (GID) identifies the address of the first instruction within the group of instructions encoded by the entry. Preferably, the group identifier (GID) is a portion of the address of the first instruction within the group. The group instruction data (GRP) represents the set of LDIs encoded within the group. In addition, each entry may also include a usage field U (not shown) that can be used to control the replacement and/or overwriting of entries when, for example, the DIB 200 is full. As shown in FIG. 5, the DIB 200 may be arranged, like a conventional cache, as an array 300 of entries. For example, the DIB 200 may include 256 entries each containing 128 bytes. Moreover, the DIB 200 may have a fully associative, set associative, or direct mapped structure. As shown, the DIB 200 is set associative being organized as 2 sets of 128 entries each. A more detailed example of the structure and operation of the DIB 200 may be found in Stone, HIGH-PERFORMANCE COMPUTER ARCHITECTURE, pg. 29–69, Addison-Wesley Pub. Co., 1987, hereinafter incorporated by reference in its entirety.

Figure 6:
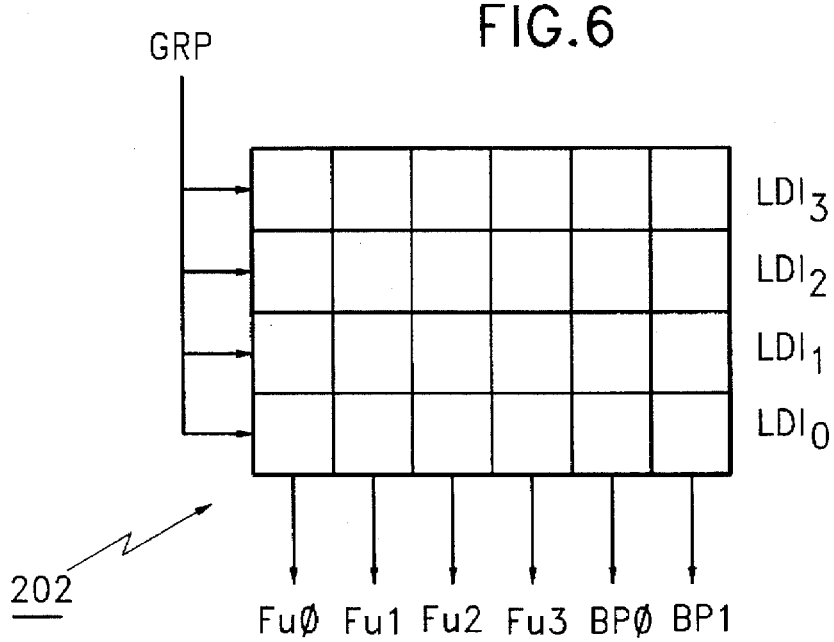
FIG. 6 is a functional block diagram of the Current Group Buffer of FIG. 2.

As shown in FIGS. 4 and 6, the CGB 204 may be arranged as an array of entries wherein each entry stores an LDI that, as described above, represents an alternate encoding of a set of original instructions that can be executed in a single machine cycle. For example, the CGB 204 may include four entries $LDI_0, LDI_1, LDI_2, LDI_3$ as shown. Each LDI includes op-fields that describe the controls for the execution units of the parallel engine 125 of FIG. 2 for a single machine cycle. For example, $LDI_0$ includes op-fields $FU0_0$, $FU1_0$, $FU2_0$, $FU3_0$ that control the functional units FU0 . . . FU3, respectively, and includes op-fields $BP0_0$, $BP1_0$ that controls the branch processing units BP0 and BP1, respectively. In this example, the op-fields of $LDI_0$ may control the execution units of the parallel engine 125 in a first machine cycle, the op-fields of $LDI_1$ control the execution units in a second machine cycle subsequent to the first cycle, the op-fields of $LDI_2$ control the execution units in a third machine cycle subsequent to the first and second cycles, and the op-fields of $LDI_3$ control the execution units in a fourth machine cycle subsequent to the first, second and third cycles.

Importantly, one of $LDI_0, LDI_1, LDI_2, LDI_3$ includes a BP op-field that terminates the group by controlling one of the branch processing units, BP0 or BP1, to branch out of the group. The branch out of the group may be to the address of another group stored in the DIB 200 or may be to the address of an instruction in the original sequence stored in the memory system 107. For example, if a group is full (i.e., includes instructions in each LDI), $LDI_3$ may include op-field $BP0_3$ that terminates the group by controlling the branch processing unit BP0 to branch out of the group. In another example, $LDI_1$ may include op-field $BPI_1$ that terminates the group by controlling the branch processing unit BP1 to branch out of the group. Preferably, the branch processing unit branches out of the group by placing the address outside the group on the NEXT_IADDR bus 121.

Moreover, because the multiple branch processing units of the parallel engine 125 are capable of completing more than one branch instruction in a given machine cycle, one of the branch processing units preferably is assigned a higher priority than the other branch processing units such that, if both branch processing units determine that the branch instruction encoded by the respective op-field has been resolved taken, the branch processing unit of highest priority places the target address of the branch instruction resolved taken onto the NEXT_IADDR bus 121. For example, BP0 may be assigned a higher priority than BP1. In this case, the op-fields of LDIs that are associated with BP1 correspond to branch instructions that occur latter in the original program sequence than branch instructions corresponding to the op-fields of the LDIs associated with BP0. Thus, in a given LDI, if both branch processing units BP0 and BP1 determine that the branch instructions encoded by the respective op-fields have been resolved taken, the branch processing unit of highest priority, BP0, places the target address of the branch instruction resolved taken onto the NEXT IADDR bus 121, thus maintaining the control flow of the original program sequence.

The functional units of the parallel engine 125 execute the LDIs of the CGB 204 in sequential order. More specifically, in the first machine cycle, the op-fields of $LDI_0$ are dispatched to the functional units of the parallel engine 125 for execution and the op-fields of $LDI_1, LDI_2, LDI_3$ are shifted to $LDI_0, LDI_1, LDI_2$, respectively. In this first cycle, the functional units FU0 . . . FU3 execute the instructions encoded by their respective op-fields in $LDI_0$. Moreover, in the first cycle, the branch processing units BP0 and BP1 execute branch instructions encoded by their respective op-fields in $LDI_0$ by examining the condition registers 119 and comparing them with the desired condition.

If only one of the branch processing units, BP0 or BP1, determines that the branch instruction encoded by the respective op-field of $LDI_0$ has been resolved taken, the one branch processing unit examines the target address of the resolved taken branch instruction to determine if the target address points to an LDI within the group currently stored in the CGB 204 or points to instructions outside the group. If the one branch processing unit determines the target address points to an LDI within the group, the one branch processing unit shifts the op-fields of the LDIs accordingly such that the particular LDI is dispatched for execution by the functional units and branch processing units of the parallel engine 125 in the next machine cycle. However, if the one branch processing unit determines the target address points outside the group, the one branch processing unit branches out of the group by presenting the target address onto the next_IADDR bus 121.

If both branch processing units BP0 and BP1 determine that the branch instructions encoded by the respective op-fields of $LDI_0$ have been resolved taken, the branch processing unit of highest priority, for example BP0, examines the target address of the resolved taken branch instruction to determine if the target address points to a an LDI within the group currently stored in the CGB 204 or points to instructions outside the group. If the branch processing unit of highest priority determines the target address points to an LDI within the group, the branch processing unit of highest priority shifts the op-fields of the LDIs accordingly such that the particular LDI is dispatched for execution by the functional units and branch processing units of the parallel engine 125 in the next machine cycle. However, if the branch processing unit of highest priority determines the target address points outside the group, the branch processing unit of highest priority branches out of the group by placing the target address onto the NEXT_IADDR bus 121.

Finally, if both branch processing units BP0 and BP1 determine that the branch instructions encoded by the respective op-fields of $LDI_0$ have been resolved not taken, operation of the parallel engine 125 continues to process the next LDI in the sequence, unless the current LDI includes the terminating branch out of the group as described above wherein the address outside the group is placed on the NEXT_IADDR bus 121.

Having described the structure of the DIB 200 and the CGB 204, the operation of the DIB 200 and CGB 204 is now set forth with reference to FIGS. 2–6. For purposes of the description, consider three machine cycles wherein a first machine cycle is immediately followed by a second machine cycle which is immediately followed by a third machine cycle. Furthermore, in the first machine cycle, the conventional sequential machine has completed an instruction and presented the address of the next instruction on the NEXT_IADDR bus 121. As described above, the DIB 200 stores data representing sets of original instructions such that the next execution of the same sets of original instructions can be executed in parallel by the execution units of the parallel engine 125. The CGB 202, on the other hand, stores data representing a single set, or group, of original instructions that are currently being executed in parallel by the execution units of the parallel engine 125.

In order to determine if the next instruction is part of the set or sets of instructions encoded in the DIB 200, an NID generator 206 generates a next instruction identifier (NID) according to the address of the next instruction presented on the NEXT_IADDR bus 121. The next instruction identifier NID must correspond to the GID(S) of the entries of the DIB 200. For example, in the case where the GID of each entry is a portion of the address of the first instruction in the group, the next instruction identifier (NID) may be the corresponding portion of the address present on the NEXT_IADDR bus 121.

In the first machine cycle, a control unit 202 controls the DIB 200 via the DIB control bus 208 to load the NID generated by the NID generator 206 into an input latch 304 as shown in FIG. 5. In the first cycle, the NID or a portion of the full NID stored in the input latch 304 of the DIB 200 is supplied to a decoder 306 whose function is to activate the corresponding row of the array 302. Each entry of the activated row (the two entries as shown) is read out of the array 302 and along with the NID stored in the input latch 304 is supplied to hit recognition and detection logic 308. The hit recognition and detection logic determines if the GID of one of the entries read from the array 302 matches the NID supplied-via the input latch 304. If this condition is met, the hit recognition and detection logic 308 outputs a DIB hit signal to the control unit 202 and outputs the GRP data of the matching entry. Otherwise, the hit recognition and detection logic 308 outputs a DIB miss signal to the control unit 202.

In the first cycle, if the control unit 202 receives a DIB hit signal from the hit recognition and detection logic 308 of the DIB 200 (i.e., the instruction is part of a group stored in the DIB 200), the control unit 202 controls the CGB 204 to load the group data output by the DIB 200. However, if the control unit 202 receives a DIB miss signal from the hit recognition and detection logic 308 of the DIB 200 (i.e., the instruction is not part of a group stored in the DIB 200), the control unit 202 controls the sequential machine to execute the next instruction identified by the address present on the NEXT_IADDR bus 121 in the second cycle.

In the second cycle, the functional units and branch processing units of the parallel engine 125 execute $LDI_0$ of the group of LDIs loaded into the CGB 204 in the first cycle. As described above, the branch processing units of the parallel engine 125 execute branch instructions encoded by their respective op-fields of $LDI_0$ by examining the condition registers 119 and comparing them with the desired condition.

If only one of the branch processing units, BP0 or BP1, determines that the branch instruction encoded by the respective op-field of $LDI_0$ has been resolved taken, the one branch processing unit examines the target address of the resolved taken branch instruction to determine if the target address points to a an LDI within the group currently stored in the CGB 204 or points to instructions outside the group.

If the one branch processing unit determines the target address points to an LDI within the group, the one branch processing unit shifts the op-fields of the LDIs accordingly such that the particular LDI is dispatched for execution by the functional units and branch processing units of the parallel engine 125 in the third machine cycle. However, if the one branch processing unit determines the target address points outside the group, the one branch processing unit presents the target address to the NEXT_IADDR bus 121.

If both branch processing units BP0 and BP1 determine that the branch instructions encoded by the respective op-fields of $LDI_0$ have been resolved taken, the branch processing unit of highest priority, for example BP0, examines the target address of the resolved taken branch instruction to determine if the target address points to a an LDI within the group currently stored in the CGB 204 or points to instructions outside the group. If the branch processing unit of highest priority determines the target address points to an LDI within the group, the branch processing unit of highest priority shifts the op-fields of the LDIs accordingly such that the particular LDI is dispatched for execution by the functional units and branch processing units of the parallel engine 125 in the third machine cycle. However, if the branch processing unit of highest priority determines the target address points outside the group, the branch processing unit of highest priority presents the target address to the NEXT_IADDR bus 121.

Moreover, in the second cycle, if $LDI_0$ includes a terminating branch instruction out of the group as describe above, the appropriate branch processing unit presents the address of the next instruction out of the group to the NEXT_IADDR bus 121.

In the second cycle, when one of the branch processing units of the parallel engine 125 presents an address to the NEXT_IADDR bus 121, the NID generator 206 generates a next instruction identifier (NID) according to the address presented on the NEXT_IADDR bus 121, and the control unit 202 accesses the DIB 200 with the generated NID as described above to determine if a matching entry is found in the DIB 200. If a matching entry is found, the control unit 202 receives a DIB hit signal from the hit recognition and detection logic 308 of the DIB 200, and the control unit 202 controls the CGB 204 to load the group data output by the DIB 200 for execution in the third machine cycle. However, if a matching entry is not found, the control unit 202 receives a DIB miss signal from the hit recognition and detection logic 308 of the DIB 200, and the control unit 202 controls the sequential machine to execute the next instruction identified by the address present on the NEXT_IADDR bus 121 in the third machine cycle.

Finally, in the second cycle, if both branch processing units BP0 and BP1 determine that the branch instructions encoded by the respective op-fields of $LDI_0$ have been resolved not taken, operation of the parallel engine 125 continues to the third machine cycle wherein the next LDI in the sequence, $LDI_1$, is processed as described above with respect to processing of $LDI_0$ in the second machine cycle.

Thus, as long as the next address points to an LDI in the CGB 204 or to an entry of the DIB 200, the parallel engine 125 retires one LDI every cycle.

As described above, only one of the branch processing units of the parallel engine 125 accesses the DIB 200 to determine if the next instruction in the sequence is present in the DIB 200. However, the invention is not limited in this respect. In a more complex embodiment, the DIB 200 may be multi-ported and thus allow, for example, both branch processing units, BP0 and BP1, of the parallel engine 125 to access the DIB 200. In this case, the structure of the DIB 200 may be modified such that a plurality of matching entries may be read out from the DIB, and the matching entry corresponding to the branch processing unit with highest priority is selected and loaded into the CGB 204 for processing. This approach may be utilized to minimize the time required to determine if the next instruction in the sequence is present in the DIB 200.

Concurrent with and/or subsequent to the execution of instructions by the execution units of the sequential machine, the group formatter 123 analyzes these instructions for dependencies and instruction latency, generates groups of long decoded instructions (LDIs) according to the analysis, and saves the groups of LDIs as entries in the DIB of the parallel engine 125 so that the next execution of these instructions can be executed in parallel by the parallel engine 125.

We will now describe the operation of the group formatter 123 in generating groups of LDIs according to analysis of the original instruction sequence using an example depicted in FIGS. 7 through 10.

Figure 7:
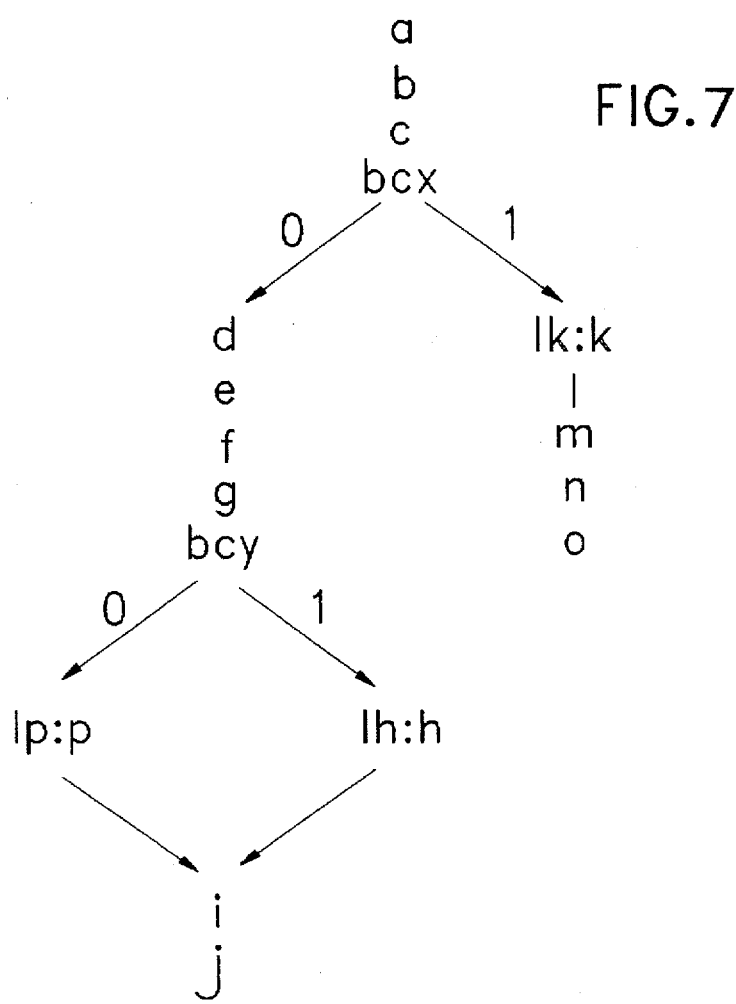
FIG. 7 is a program graph of a sequence of instructions that are executed by the execution units of FIG. 1.

FIG. 7 is program graph illustrating an example of a sequence of instructions stored in the memory system 107 that is to be executed by the execution units 101,103,105 of the sequential machine. Instructions a, b and c are followed by a branch instruction bcx which tests a condition x and branches to instruction d if $x=0$ and to instruction k if $x=1$. On the path from instruction k are instructions l, m, n and o. On the path from instruction d are instructions e, f, g and another branch instruction bcy, which tests a condition y and branches to instruction p if $y=0$, and branches to instruction h if $y=1$. Both these paths merge back to instructions i, j.

FIG. 8 shows the dependency for each instruction within the sequence. Instructions a and b do not depend on other instructions in this sequence. Instruction c depends on both instructions a and b, which implies that it can be executed only after instructions a and b have been executed. Similarly for the other instructions. Finally the branch instruction bcx is dependent on the result of instruction a, while the branch instruction bcy is dependent on the result of instruction e.

FIG. 9 illustrates three examples of the execution of the sequence of instructions by the execution units 101,103,105 of the sequential machine. In the first example as shown in FIG. 9(A), the branch instruction bcx took the path corresponding to $x=0$ while the branch instruction bcy took the path corresponding to $y=1$. In the second example as shown in FIG. 9(B), the branch instruction bcx took the other path, namely that corresponding to $x=1$. Finally, in the third example as shown in FIG. 9(C), the branch instruction bcx took the path corresponding to $x=0$ while the branch instruction bcy took the path corresponding to $y=0$.

FIG. 10(A) illustrates the operation of the group formatter 123 in generating a group of LDIs ($LDI_0$ ... $LDI_3$) according to analysis of the instruction sequence of FIG. 9(A). The instruction sequence begins with instructions a and b. Because neither instruction a nor instruction b is dependent on any other instruction, the group formatter 123 generates op-fields FU0 and FU1 that correspond to instructions a and b, respectively, and places the op-fields into $LDI_0$ as shown. Instruction c follows instructions a and b. Because instruction c depends on both instructions a and b, the group formatter 123 generates op-field FU0 corresponding to instruction c and places the op-field into $LDI_1$ as shown.

The branch instruction bcx is next. If the branch instruction is to be placed in-order (as shown), the branch instruction must be placed in an LDI no earlier than the LDI of the instructions preceding the branch instruction. This condition is required because if, when executing the LDIs of the group, the parallel engine 125 determines the branch conditions of the encoded branch instructions have been satisfied, the instructions preceding the branch must be completed. If the branch instruction is to be placed out-of-order, additional information must be stored that indicate, for each branch instruction, the last LDI corresponding to the instructions preceding the particular branch instruction. In this case, when executing the LDIs of the group, if the parallel engine 125 determines the branch conditions of an encoded branch instruction have been satisfied, the parallel engine must execute the LDIs up to the latest LDI as indicated by the stored information such that the instructions preceding the branch instruction are completed.

Thus, for in-order execution of branch instructions (as shown), the group formatter 123 generates an op-field BP0 corresponding to the branch instruction bcx and places the op-field into $LDI_1$. Moreover, the control flow encoded in the op-field BP0 by the group formatter 123 preferably corresponds to the outcome of the branch instruction bcx as determined by the sequential machine. Thus, because the sequential machine determined that condition $x=0$ is satisfied upon encountering the branch instruction bcx, BP0 of $LDI_1$ as shown indicates that if $x=_1$ the parallel engine 125 should branch out of the group to label LK (i.e., the instruction k).

Instruction d follows the branch instruction bcx in the sequence. Because instruction d is dependent upon instructions a and c, the group formatter 123 generates an op-field corresponding to instruction d and places the op-field in $LDI_2$. The group formatter 123 may also set a flag associated with instruction d indicating that instruction d is to be executed by the parallel engine 125 only if the condition of bcx is satisfied as $x=0$. Instruction e follows instruction d. Because instruction e is not dependent upon any other instruction, the group formatter 123 generates an op-field FU2 corresponding to instruction e and places the op-field in $LDI_0$. The group formatter 123 may also set a flag associated with instruction e indicating that instruction e is to be executed by the parallel engine 125 only if the condition of bcx is satisfied as $x=0$. Instruction f is next in the sequence. Because instruction f is dependent upon instruction e, the group formatter 123 generates an op-field FU1 corresponding to instruction f and places the op-field in $LDI_1$. The group formatter 123 may also set a flag associated with instruction f indicating that instruction f is to be executed by the parallel engine 125 only if the condition of bcx is satisfied as $x=0$. Instruction g follows next. Because instruction g is dependent upon instructions e and f, the group formatter 123 generates an op-field FU1 corresponding to instruction g and places the op-field in $LDI_2$. The group formatter 123 may also set a flag associated with instruction g indicating that instruction g is to be executed by the parallel engine 125 only if the condition of bcx is satisfied as $x=0$.

The branch instruction bcy follows instruction g. Because the branch instruction bcy must be placed in an LDI no earlier than the LDI of the instructions preceding the branch instruction bcy, the group formatter 123 generates an op-field BP0 corresponding to the branch instruction bcy and places the op-field into $LDI_2$. Moreover, the control flow encoded in the op-field BP0 by the group formatter 123 preferably corresponds to the outcome of the branch instruction bcy as determined by the sequential machine. Thus, because the sequential machine determined that condition y=1 is satisfied upon encountering the branch instruction bcy, op-field BP0 of $LDI_2$ as shown indicates that if y=0 the parallel engine 125 should branch out of the group to label LP (i.e. instruction p).

Instruction h follows the branch instruction bcy. Because instruction h is dependent upon instructions b and f, the group formatter 123 generates an op-field FU2 corresponding to instruction d and places the op-field in $LDI_2$. The group formatter 123 may also set a flag associated with instruction h indicating that instruction h is to be executed by the parallel engine 125 only if the condition of bcx is satisfied as x=0 and the condition of bcy is satisfied as y=1. Instruction i follows instruction h. Because instruction i is dependent upon instructions d and g, the group formatter 123 generates an op-field FU0 corresponding to instruction i and places the op-field in $LDI_3$. The group formatter 123 may also set a flag associated with instruction i indicating that instruction i is to be executed by the parallel engine 125 only if the condition of bcx is satisfied as x=0 and the condition of bcy is satisfied as y=1.

Instruction j is next in the sequence. Because instruction j is dependent upon instruction i and there are no more LDIs available (i.e., the instruction i being encoded in the last LDI of the group, $LDI_3$), instruction j cannot be placed in the current group. In this case, the group formatter 123 closes the group by generating an op-field BP0 that represents a branch to the address of instruction j (i.e., the label LJ as shown) only if the condition of bcx is satisfied as x=0 and the condition of bcy is satisfied as y=1.

After closing the group, the group formatter 123 writes the closed group to the DIB and then begins the new group by generating an op-field FU0 corresponding to the instruction j and placing the op-field in $LDI_0$ of the new group. The operation of the group formatter 123 continues as described above for the instruction sequence of the new group.

Similarly, FIGS. 10(B) and 10(C) illustrate the formation of the group performed by the group formatter 123 according to the instruction sequence of FIGS. 9(B) and 9(C), respectively.

Figure 11:
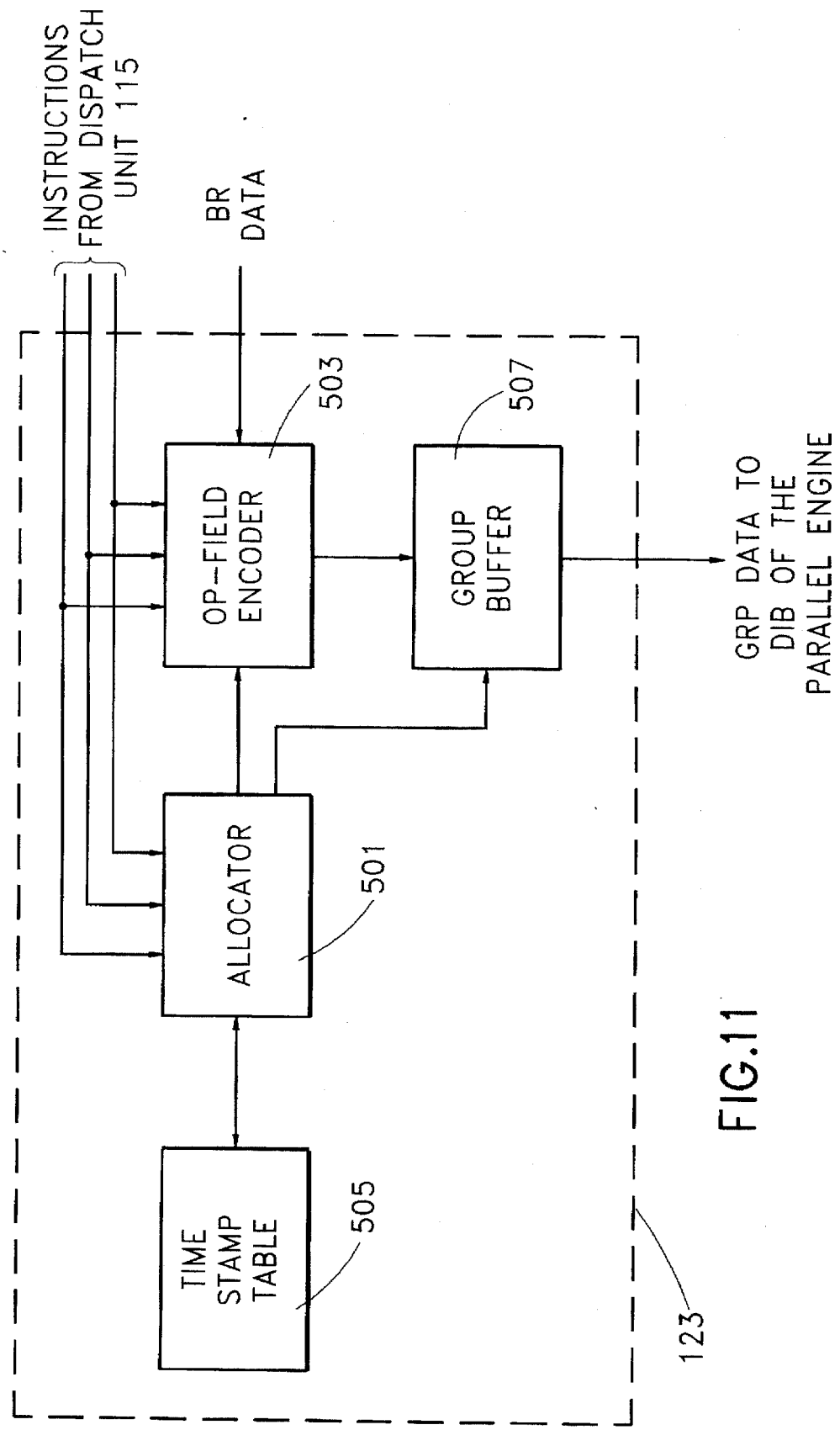
FIG. 11 is a functional block diagram of the group formatter of FIG. 1.

Having described the operation of the group formatter 123, a specific example of a hardware embodiment of the group formatter 123 is now set forth. As shown in FIG. 11, the group formatter 123 may include an allocator 501, a op-field encoder 503, a time stamp table (TST) 505, and a group buffer 507.

The op-field encoder 503 receives instructions dispatched by the dispatch unit 115 for execution by the execution units of the sequential machine, and also receives branch outcome (BR) data generated by the branch processing unit 105 of the sequential machine. For each of these instructions, the op-field encoder 503 generates at least one op-field that corresponds to the instruction. The encoding performed by the op-field encoder 503 may include formatting the instruction into a format compatible with the functional units and branch processing units of the parallel engine 125, and/or translating the instruction into one or more op-fields that are compatible with the functional units and branch processing units of the parallel engine 125. A more detailed description of the operation of the op-field encoder 503 in translating instructions may be found, for example, in U.S. application Ser. No. (Attorney Docket No. Y 0995-026), in the name of P. Emma, entitled "Method and Apparatus for the Transparent Emulation of an Existing Instruction-Set Architecture by an Arbitrary Underlying Instruction-Set Architecture", commonly assigned to the assignee of the present application, filed concurrently herewith and incorporated herein by reference in its entirety. Furthermore, for branch instructions, the encoding performed by the op-field encoder 503 preferably corresponds to the outcome of the branch instruction as evidenced by the BR data supplied from the branch processing unit 105 of the sequential machine.

The TST 505 contains timing information pertaining to each register resource of the parallel engine 125 that an instruction may either use or define. Generally, the allocator 501 utilizes the timing information stored in the TST 505 and the op-fields generated by the op-field encoder 503 to build the current group of LDIS. The group buffer 507 is utilized to store the current group of LDIs as the group is being built by the allocator 501.

More particularly, the TST 505 stores time stamp identifiers that identifies the LDI of the current group wherein the associated register resource of the parallel engine 125 is available (i.e., prior instructions of the group that define the register resource will be completed). For example, the parallel engine 125 may include 76 registers as is conventional in PowerPC microprocessors wherein the 76 registers include 32 general purpose registers, 32 floating point registers, a link (LR) register, a count (CTR) register, a fixed-point exception (XER) register and a floating point status and control (FPSCR) register. In this case, the TST 505 may include 76 cells each storing an identifier that identifies the LDI of the current group wherein the associated register is available.

Figure 12A:
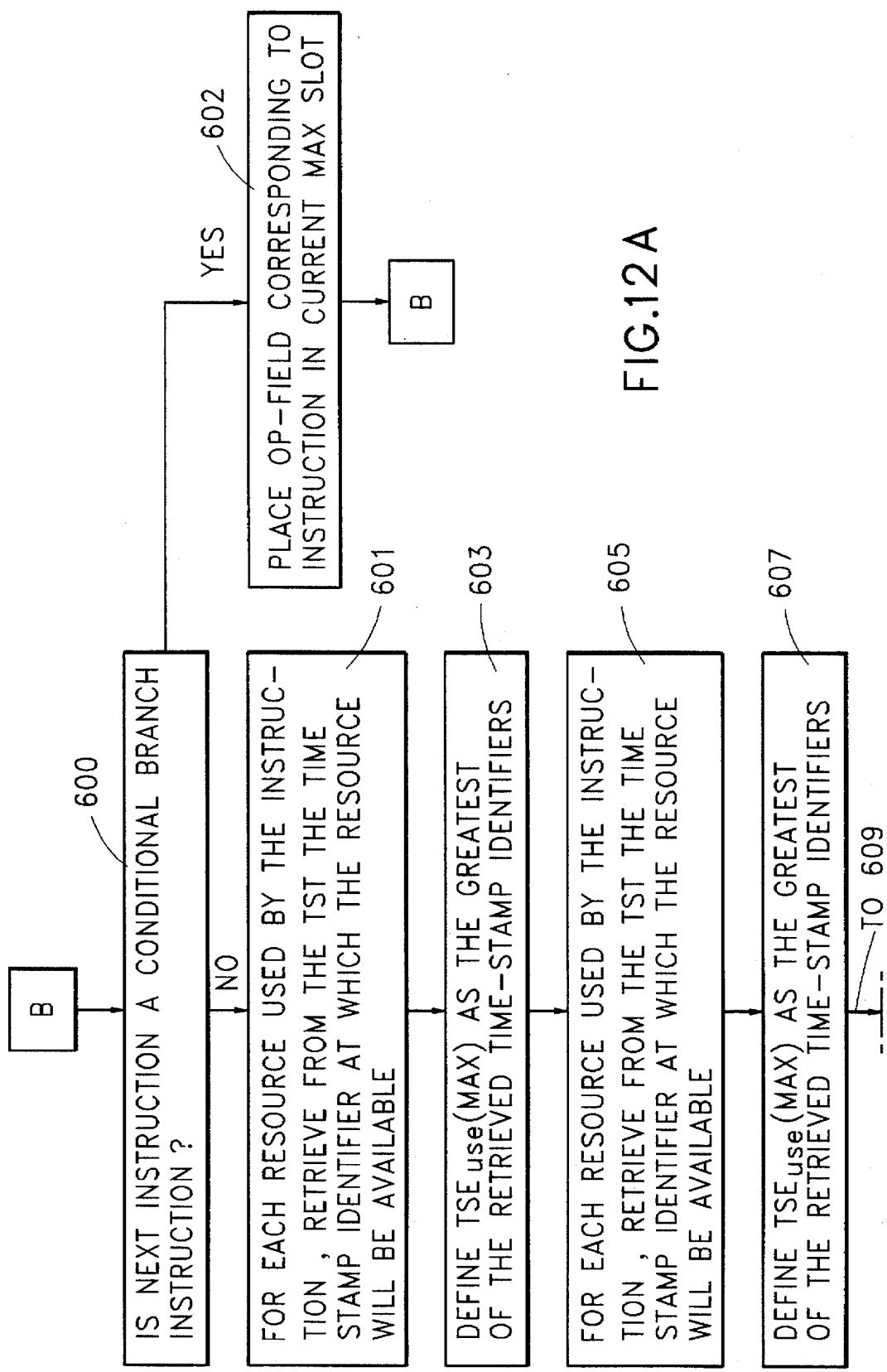
FIG. 12 is a flow chart illustrating the operation of the allocator of FIG. 11 in building a group of LDIs.
Figure 12B:
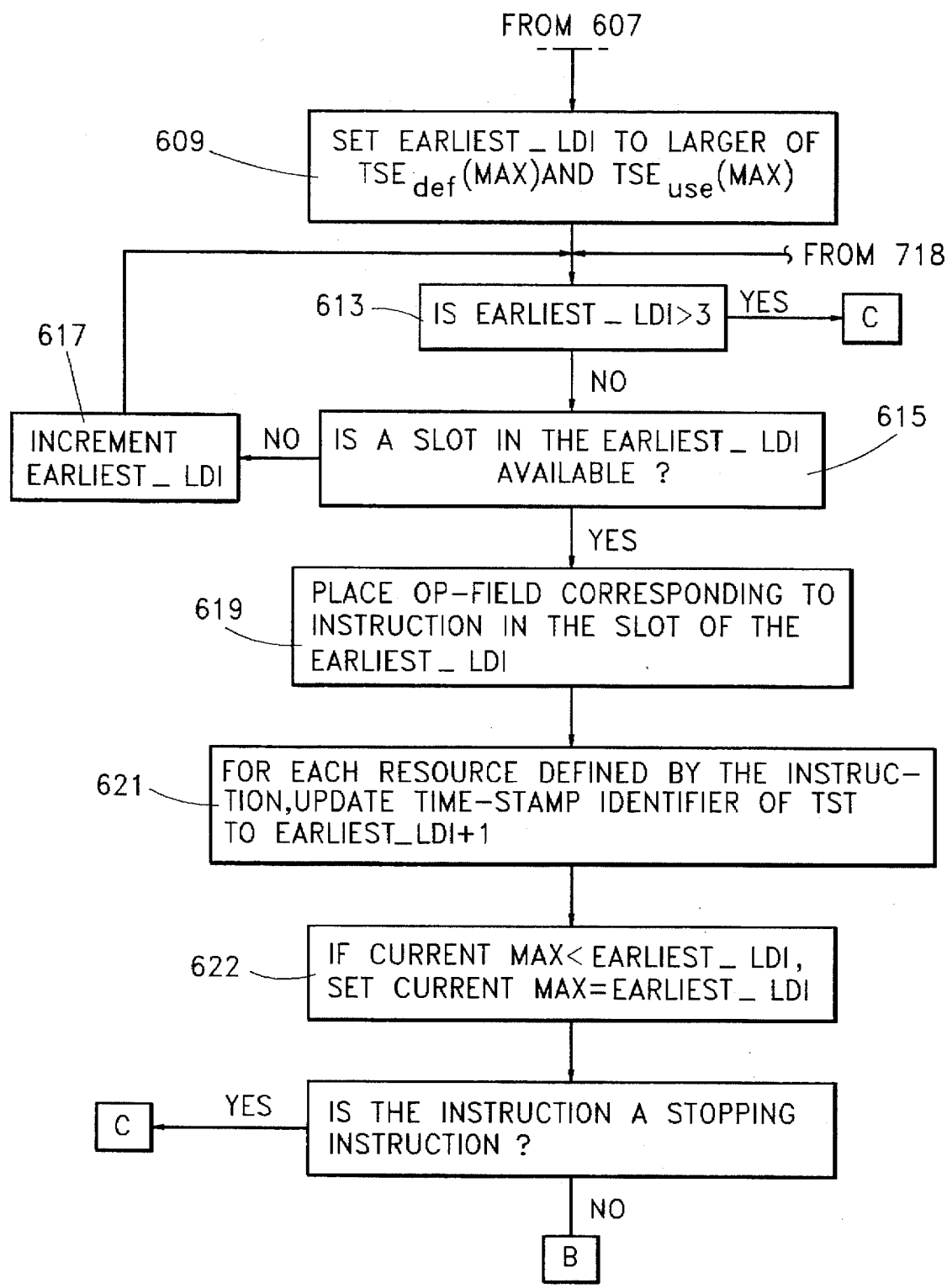
Figure 13:
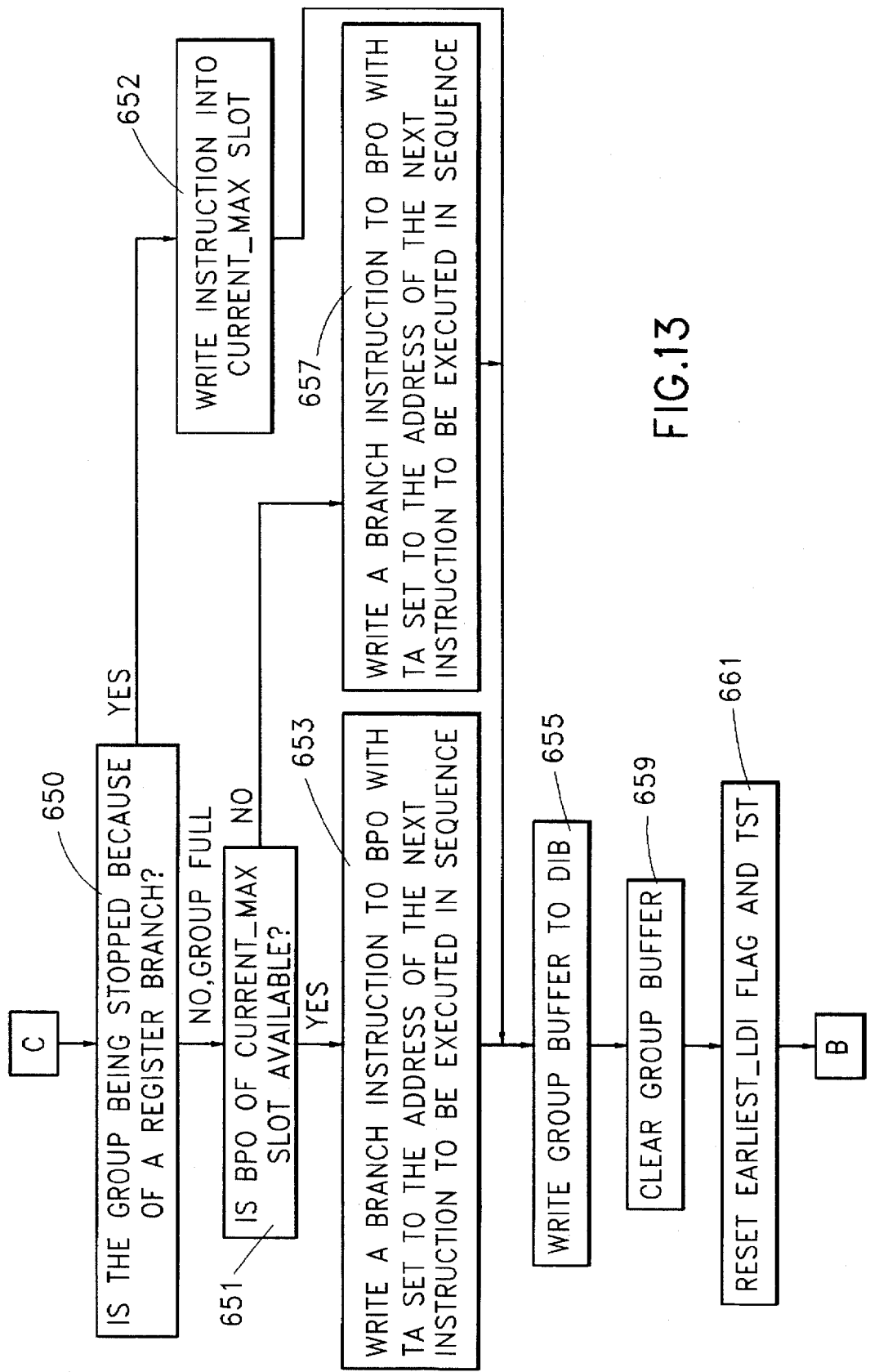
FIG. 13 is a flow chart illustrating the operation of the allocator of FIG. 11 in closing a group of LDIs.

For each instruction dispatched for execution by the execution units of the sequential machine, the allocator 501 interacts with the TST 505, the op-field encoder 503 and the group buffer 507 as illustrated in the flow charts of FIGS. 12 and 13 to form and store groups of LDIS that correspond to these instructions. The implementation of the allocator 501 may include, for example, a sequencer or combination logic. Beginning in step 600, the allocator 501 checks whether the particular instruction is a conditional branch instruction. If so, in step 602, the allocator 501 controls the op-field encoder 503 to write the op-field corresponding to the instruction into the available slot of the LDI corresponding to a current_max flag in the group buffer 507, and, for each resource defined by the instruction, updates the time stamp identifier associated with the resource to [current_max flag+1] and writes the updated time stamp identifier to the TST 505. The current_max flag tracks the current maximum LDI such that the conditional branch instructions may be maintained in order. If conditional branch instructions are to be placed out-of-order, additional information must be stored that indicate, for each branch instruction, the last LDI corresponding to the instructions preceding the particular branch instruction. In this case, when executing the LDIS of the group, if the parallel engine 125 determines the branch conditions of an encoded conditional branch instruction have been satisfied, the parallel engine executes the LDIs up to the latest LDI as indicated by the stored information such that the instructions preceding the conditional branch instruction are completed. After step 602, operation returns back to step 600 to begin processing the next instruction of the sequence for incorporation into the current group.

If in step 600, the allocator determines that the instruction is not a conditional branch instruction, operation continues to step 601. In step 601, for each resource used by the particular instruction, the allocator 501 retrieves from the TST 505 the time stamp identifier corresponding to the resource that identifies the LDI at which the resource will be available. In step 603, the allocator 501 determines the greatest of the time stamp identifiers retrieved in step 601, labeled $TS_{use}$ (MAX) for illustrative purposes. In step 605, for each resource defined by the particular instruction, the allocator 501 retrieves from the TST 505 the time stamp identifier corresponding to the resource that identifies the LDI at which the resource will be available. In step 607, the allocator 603 determines the greatest of the time stamp identifiers retrieved in step 605, labeled $TS_{def}$ (MAX) for illustrative purposes.

In step 609, the allocator 501 sets an earliest_LDI flag to the larger of $TS_{use}$(MAX) and $TS_{def}$(MAX) such that if the particular instruction defines resources that have already been defined by instructions in the group (i.e., redefines any resources), the particular instruction precedes such instructions. In step 613, the allocator 501 determines whether there is room for the instruction in the current group (i.e., is the group full) by checking whether the earliest_LDI flag is greater than 3. If so, the group is full and operation continues to the steps illustrated in FIG. 13 as discussed below to close the group and write the closed group from the group buffer 507 to the DIB of the parallel engine 125. If the group is not full, operation continues to step 615 to determine whether a slot in the LDI corresponding to the earliest_LDI flag is available. If not, in step 617, the earliest_LDI flag is incremented and operation returns back to step 613. However, if in step 615 a slot in the LDI corresponding to the earliest_LDI flag is available, operation continues to steps 619 to 621. In step 619, the allocator 501 controls the op-field encoder 503 to write the op-field corresponding to the instruction into the available slot of the LDI stored in the group buffer 507. In step 621, for each resource defined by the instruction, the allocator 501 updates the time stamp identifier associated with the resource to [earliest_LDI flag+1} and writes the updated time stamp identifier to the TST 505.

In step 622, the allocator 501 determines if the current_max flag is less than the earliest_LDI flag, and if so sets the current_max flag to the earliest_Ldi flag, thus updating the current_max flag.

In the preferred embodiment, particular instructions may be designated stopping instructions (i.e., instructions that cause the group to be closed automatically, even if the group is not full). For example, a register branch instruction may be designated a stopping instruction. In this case, in step 623, the allocator 501 checks whether the instruction is a stopping instruction. If the instruction is a stopping instruction, operation continues to the steps illustrated in FIG. 13 as discussed below to close the group and write the closed group from the group buffer 505 to the DIB of the parallel engine 125. However, if in step 623, the allocator determines the instruction is not a stopping instruction, the operation of the allocator 501 returns back to step 601 to process the next instruction in the sequence.

The operation of the allocator 501 in closing the group and writing the closed group from the group buffer 507 to the DIB of the parallel engine 125 is shown in detail in FIG. 13. In step 650, the allocator 501 begins by checking whether the group is being stopped because of a register branch instruction. This may be accomplished by checking a flag set in step 623. If in step 650 the allocator 501 determines the instruction is a register branch instruction, in step 652 the allocator controls the op-field encoder 503 to write the op-field corresponding to the instruction into the available slot of the LDI corresponding to a current_max flag in the group buffer 507, and, for each resource defined by the instruction, updates the time stamp identifier associated with the resource to [current_max flag+1} and writes the updated time stamp identifier to the TST 505.

If in step 650, the allocator 501 determines the instruction is not a branch instruction, the group must be full. Therefore, in step 651, the allocator 501 determines if the BP0 slot of the LDI corresponding to the current_max flag is available. If so, in step 653, the allocator 501 places a op-field representing a terminating branch instruction into the available BP0 slot of the group buffer 505 and operation continues to step 655. The target address of the terminating branch instruction points to the address of the next instruction to be executed in the sequence.

However, if in step 651 the BP0 slot is unavailable, operation continues to step 657 wherein the allocator 501 places a op-field representing a terminating branch instruction into the BP1 slot of the LDI corresponding to the current_max flag in the group buffer 507 and operation continues to step 655. The target address of the terminating branch instruction points to the address of the next instruction to be executed in the sequence.

In step 655, the allocator 501 writes the group buffer 507 to the DIB of the parallel engine 125. In step 659, the allocator 501 clears the group buffer 507. Finally, in step 661, the allocator 501 resets the earliest_LDI flag and TST 505, before returning to the steps discussed above with respect to FIG. 12 to begin processing the next instruction of the sequence for incorporation into a new group.

The operation of the group formatter 123 as discussed above is best illustrated with a simple example. Consider the following sequence of instructions:

| 1. | a   | r1 = r2,r3 | (R1 = R2 + R3) |
|----|-----|------------|----------------|
| 2. | a   | r4 = r1,r5 | (R4 = R1 + R5) |
| 3. | mul | r3 = r1,r4 | (R3 = R1 * R4) |
| 4. | a   | r4 = r2,r5 | (R4 = R2 + R5) |
| 5. | inc | r4         | (R4 = R4 + 1)  |
| 6. | mul | r2 = r3,r4 | (R2 = R3 * R4) |

FIGS. 14(A) and (B) illustrates the state of the TST 505 and group buffer 507 as the group formatter 123 operates to format this sequence of instructions into a group as described above with respect to FIGS. 12 and 13.

At the beginning of the group, prior to processing the first instruction, the TST 505 is initialized to have zeros in each cell. For the first instruction, because the resources used by the instruction, r2 and r3, have a corresponding time stamp identifier of 0, the allocator defines $TS_{use}$ (MAX) as 0 in step 603. Furthermore, because the resource defined by the instruction, r1, has a corresponding time stamp identifier of 0, the allocator defines $TS_{def}$(MAX) as 0 in step 607. In step 609, the allocator 501 sets the earliest_LDI flag to 0, and flow continues to step 613. In step 613, because the earliest_LDI flag, which is now set to zero, is not greater than three, the allocator 501 in step 615 checks whether a slot FU0 . . . FU3 is available in the LDI corresponding to the earliest_LDI flag, in this case $LDI_0$. Because slot FU0 is available in $LDI_0$, operation continues to step 619 wherein the allocator 501 controls the op-field encoder 503 to place the op-field corresponding to the first instruction into the FU0 slot of $LDI_0$ as shown in FIG. 14(B). Then, in step 621, the allocator 501 updates the time stamp identifier corresponding to the resources defined by the first instruction, in this case r1 to the increment of the earliest_LDI flag (i.e., earliest_LDI+1), which in this case is 1, as shown in FIG. 14(A). In step 623, because the first instruction is not a stopping instruction, operation of the group formatter 123 continues to the second instruction in the sequence.

For the second instruction, because the resources used by the instruction, r1 and r5, have a corresponding time stamp identifier of 1 and 0, respectively, the allocator defines $TS_{use}$ (MAX) as 1 in step 603. Furthermore, because the resource defined by the instruction, r4, has a corresponding time stamp identifier of 0, the allocator defines $TS_{def}$ (MAX) as 0 in step 607. In step 609, the allocator 501 sets the earliest_LDI flag to $TS_{use}$ (MAX), which is equal to 1, and flow continues to step 613. In step 613, because the earliest_LDI flag, which is now set to 1, is not greater than three, the allocator 501 in step 615 checks whether a slot FU0 ... FU3 is available in the LDI corresponding to the earliest_LDI flag, in this case $LDI_1$. Because slot FU0 is available in $LDI_1$, operation continues to step 619 wherein the allocator 501 controls the op-field encoder 503 to place the op-field corresponding to the second instruction into the FU0 slot of $LDI_1$ as shown in FIG. 14(B). Then, in step 621, the allocator 501 updates the time stamp identifier corresponding to the resources defined by the second instruction, in this case r4, to the increment of the earliest_LDI flag (i.e., earliest_LDI+1), which in this case is 2, as shown in FIG. 14(A). In step 623, because the second instruction is not a stopping instruction, operation of the group formatter 123 continues to the third instruction in the sequence.

For the third instruction, because the resources used by the instruction, r1 and r4, have a corresponding time stamp identifier of 1 and 2, respectively, the allocator defines $TS_{use}$ (MAX) as 2 in step 603. Furthermore, because the resource defined by the instruction, r3, has a corresponding time stamp identifier of 0, the allocator defines $TS_{def}$ (MAX) as 0 in step 607. In step 609, the allocator 501 sets the earliest_LDI flag to $TS_{use}$ (MAX), which is equal to 2, and flow continues to step 613. In step 613, because the earliest_LDI flag, which is now set to 2, is not greater than three, the allocator 501 in step 615 checks whether a slot FU0FU3 is available in the LDI corresponding to the earliest_LDI flag, in this case $LDI_2$. Because slot FU0 is available in $LDI_2$, operation continues to step 619 wherein the allocator 501 controls the op-field encoder 503 to place the op-field corresponding to the third instruction into the FU0 slot of $LDI_2$ as shown in FIG. 14(B). Then, in step 621, the allocator 501 updates the time stamp identifier corresponding to the resources defined by the third instruction, in this case r3, to the increment of the earliest_LDI flag (i.e., earliest_LDI+1), which in this case is 3, as shown in FIG. 14(A). In step 623, because the third instruction is not a stopping instruction, operation of the group formatter 123 continues to the fourth instruction in the sequence.

For the fourth instruction, because the resources used by the instruction, r2 and r5, have a corresponding time stamp identifier of 0, the allocator defines $TS_{use}$ (MAX) as 0 in step 603. Furthermore, because the resource defined by the instruction, r4, has a corresponding time stamp identifier of 2, the allocator defines $TS_{def}$ (MAX) as 2 in step 607. In step 609, the allocator 501 sets the earliest_LDI flag to 2, and flow continues to step 613. In step 613, because the earliest_LDI flag, which is now set to 2, is not greater than three, the allocator 501 in step 615 checks whether a slot FU0 ... FU3 is available in the LDI corresponding to the earliest_LDI flag, in this case $LDI_2$. Because slot FU1 is available in $LDI_2$, operation continues to step 619 wherein the allocator 501 controls the op-field encoder 503 to place the op-field corresponding to the fourth instruction into the FU1 slot of $LDI_2$ as shown in FIG. 14(B). Then, in step 621, the allocator 501 updates the time stamp identifier corresponding to the resources defined by the fourth instruction, in this case r4, to the increment of the earliest_LDI flag (i.e., earliest_LDI +1), which in this case is 3, as shown in FIG. 14(A). In step 623, because the fourth instruction is not a stopping instruction, operation of the group formatter 123 continues to the fifth instruction in the sequence.

For the fifth instruction, because the resource used by the instruction, r4, has a corresponding time stamp identifier of 3, the allocator defines $TS_{use}$ (MAX) as 3 in step 603. Furthermore, because the resource defined by the instruction, r4, has a corresponding time stamp identifier of 3, the allocator defines $TS_{def}$(MAX) as 3 in step 607. In this case, the allocator 501 sets the earliest_LDI flag to 3, and flow continues to step 613. In step 613, because the earliest_LDI flag, which is now set to 3, is not greater than three, the allocator 501 in step 615 checks whether a slot FU0 ... FU3 is available in the LDI corresponding to the earliest_LDI flag, in this case LDI3. Because slot FU0 is available in $LDI_3$, operation continues to step 619 wherein the allocator 501 controls the op-field encoder 503 to place the op-field corresponding to the fifth instruction into the FU0 slot of $LDI_3$ as shown in FIG. 14(B). Then, in step 621, the allocator 501 updates the time stamp identifier corresponding to the resources defined by the fifth instruction, in this case r4, to the increment of the earliest_LDI flag (i.e., earliest_LDI+1), which in this case is 4, as shown in FIG. 14(A). In step 623, because the fifth instruction is not a stopping instruction, operation of the group formatter 123 continues to the sixth instruction in the sequence.

For the sixth instruction, because the resources used by the instruction, r3 and r4, have a corresponding time stamp identifier of 3 and 4, respectively, the allocator defines $TS_{use}$ (MAX) as 4 in step 603. Furthermore, because the resource defined by the instruction, r2, has a corresponding time stamp identifier of 0, the allocator defines $TS_{def}$ (MAX) as 0 in step 607. In step 609, the allocator 501 sets the earliest_LDI flag to $TS_{use}$ (MAX), which is equal to 4, and flow continues to step 613. In step 613, because the earliest_LDI flag, which is now set to 4, is greater than three, the allocator 501 branches to the steps of FIG. 13 to close the group and write the closed group stored in the group buffer 507 to the DIB of the parallel engine 125. The operation of the allocator 501 then continues to format the sixth and subsequent instructions into a new group as described above with respect to the first through fifth instructions.

Upon encountering a resource redefinition condition in step 609, the allocator 501 as described above writes the instruction into an LDI subsequent to the one or more previous instructions of the group that define the common resource, even though the resources used by the particular instruction may be available at earlier LDIs in the group. This is not the most efficient use of the resources. In an alternate embodiment, the group formatter 123 may employ conventional register renaming techniques as described in U.S. Pat. No. 4,992,938 to J. Cocke et al., commonly assigned to the assignee of the present invention and incorporated herein by reference. Register renaming provides for more efficient utilization of the resources of the parallel engine 125.

Figure 15A:
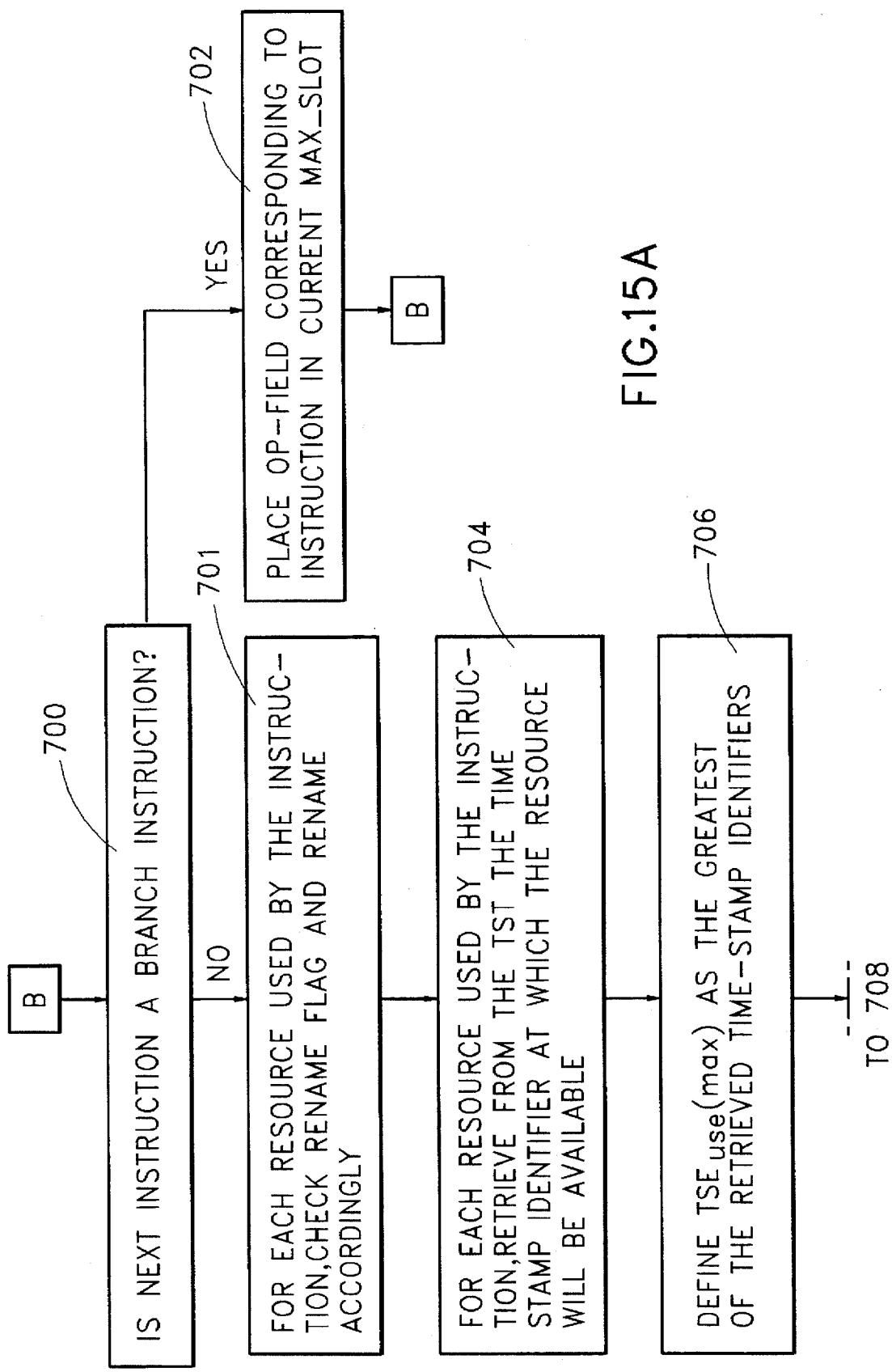
FIG. 15 is a flow chart illustrating the operation of the allocator of FIG. 11 in building a group of LDIs utilizing register renaming techniques.

More specifically, as shown in FIG. 15, the operation of the allocator 501 as described above with respect to FIGS. 12 and 13 may be modified to utilize register renaming techniques. In this case, in step 700, the allocator 501 begins by checking whether the particular instruction is a conditional branch instruction. If so, in step 702, the allocator 501 controls the op-field encoder 503 to write the op-field corresponding to the instruction into the available slot of the LDI corresponding to a current_max flag in the group buffer 507, and, for each resource defined by the instruction, updates the time stamp identifier associated with the resource to [current_max flag+1] and writes the updated time stamp identifier to the TST 505. As described above, the current_max flag tracks the current maximum LDI such that the conditional branch instructions may be maintained in order. After step 702, operation returns back to step 700 to begin processing the next instruction of the sequence for incorporation into the current group.

If in step 700, the allocator 501 determines that the instruction is not a conditional branch instruction, operation continues to step 701. In step 701, for each resource used by the particular instruction, the allocator 501 checks a rename flag associated with the resource (discussed in more detail below) and renames the resource accordingly. Then in step 704, for each resource used by the particular instruction, the allocator 501 retrieves from the TST 505 the time stamp identifier corresponding to the resource that identifies the LDI at which the resource will be available. In step 706, the allocator 501 determines the greatest of the time stamp identifiers retrieved in step 704, labeled $TS_{use}$ (MAX) for illustrative purposes.

In step 708, for each resource defined by the particular instruction, the allocator 501 checks whether the associated rename flag is set. If not, the allocator 501 in step 712 sets the rename flag, thus indicating to subsequent instructions of the group that the particular resource has been defined previously, and also initializes the new resource name as the original name of the resource, and operation continues to step 718.

However, if in step 708, for each resource defined by the particular instruction, the allocator 501 determines that the rename flag is set, operation continues to steps 710 to 716. In step 710, the allocator 501 locates a free resource, and in step 714 renames the particular resource to the free resource. In step 716, the allocator 501 sets a rename flag indicating the particular resource has been renamed and sets the new name of the resource to the free resource name, and operation continues to step 718.

In step 718, the allocator 501 sets the earliest_LDI flag to $TS_{use}$ (MAX) as defined in step 706, and operation continues to step 613 as described above with respect to FIG. 12 to place the op-field representing the instruction into the appropriate LDI in the group buffer 507.

To illustrate the operation of the group formatter 123 utilizing resource renaming techniques as discussed above, consider the same sequence of six instructions presented above. FIGS. 16(A) and (B) illustrate the state of the TST 505 and group buffer 507 as the group formatter 123 operates to format this sequence of instructions into a group as described above with respect to FIG. 15.

Because the fourth instruction is the first instruction in the sequence to trigger renaming, the results of the operation of the group formatter 123 in processing the first through third instructions remains unchanged. However, for the fourth instruction, in step 708, the rename flag associated with r4 has been set and operation continues to step 710 to locate a free resource, for example resource rM as shown in FIG. 16(A). In step 712, the allocator 501 renames the particular resource that caused the redefinition condition, in this case r4, to the free resource rM, and in step 716, the allocator 501 sets the rename flag and resource name associated indicate particular resource r4 to indicate that resource r4 has been explicitly renamed to rM. In step 718, the allocator 501 sets the earliest_LDI flag to $TS_{use}$ (MAX), which is equal to 0, and flow continues to step 613. In step 613, because the earliest_LDI flag, which is now set to 0, is not greater than three, the allocator 501 in step 615 checks whether a slot FU0 . . . FU3 is available in the LDI corresponding to the earliest_LDI flag, in this case $LDI_0$. Because slot FU1 is available in $LDI_0$, operation continues to step 619 wherein the allocator 501 controls the op-field encoder 503 to place the op-field corresponding to the fourth instruction into the FU1 slot of $LDI_0$ as shown in FIG. 16(B). Then, in step 621, the allocator 501 updates the time stamp identifier corresponding to the resources defined by the fourth instruction, in this case rM, to the increment of the earliest_LDI flag (i.e., earliest_LDI+1), which in this case is 1, as shown in FIG. 16(A). In step 623, because the fourth instruction is not a stopping instruction, operation of the group formatter 123 continues to the fifth instruction in the sequence.

For the fifth instruction, because the rename flag associated with the resources used by the instruction, in this case r4, indicates the resource r4 has been renamed, the allocator 501 renames the resource r4 to rM in step 701 as shown in FIG. 16(A). Furthermore, because the resource used by the instruction, rM, has a corresponding time stamp identifier of 1, the allocator defines $TS_{use}$ (MAX) as 1 in step 706. In step 708, because the rename flag associated with the resources defined by the instruction, in this case r4, is set, operation continues to step 710 to locate a free resource, for example resource rN as shown in FIG. 16(A). In step 712, the allocator 501 renames the particular resource that caused the redefinition condition, in this case r4, to the free resource rN, and in step 716, the allocator 501 sets the rename flag and resource name associated with the particular resource r4 to indicate that resource r4 has been explicitly renamed to rN. In step 718, the allocator 501 sets the earliest_LDI flag to $TS_{use}$ (MAX), which is equal to 1, and flow continues to step 613. In step 613, because the earliest_LDI flag, which is now set to 1, is not greater than three, the allocator 501 in step 615 checks whether a slot FU0 . . . FU3 is available in the LDI corresponding to the earliest_LDI flag, in this case $LDI_1$. Because slot FU1 is available in $LDI_1$, operation continues to step 619 wherein the allocator 501 controls the op-field encoder 503 to place the op-field corresponding to the fifth instruction into the FU1 slot of $LDI_1$ as shown in FIG. 14(B). Then, in step 621, the allocator 501 updates the time stamp identifier corresponding to the resources defined by the fifth instruction, in this case rN, to the increment of the earliest_LDI flag (i.e., earliest_LDI+1), which in this case is 2, as shown in FIG. 16(A). In step 623, because the fifth instruction is not a stopping instruction, operation of the group formatter 123 continues to the sixth instruction in the sequence.

For the sixth instruction, because the rename flag associated with the resources used by the instruction, in this case r4, indicates the resource r4 has been renamed, the allocator 501 renames the resource r4 to rN in step 701 as shown in FIG. 16(A). Furthermore, because the resources used by the instruction, r3 and rN, have a corresponding time stamp identifier of 3 and 2, respectively, the allocator defines $TS_{use}$ (MAX) as 3 in step 603. In step 708, the allocator 501 determines that the rename flag associated with the resources defined by the instruction, in this case r2, have not been reset and operation continues to step 712 to set the rename flag associated with r2 and set the resource name flag associated with r2 to its original name. In step 718, the allocator 501 sets the earliest_LDI flag to $TS_{use}$ (MAX), which is equal to 3, and flow continues to step 613. In step 613, because the earliest_LDI flag, which is now set to 3, is not greater than three, the allocator 501 in step 615 checks whether a slot FU0 . . . FU3 is available in the LDI corresponding to the earliest_LDI flag, in this case $LDI_3$. Because slot FU1 is available in $LDI_3$, operation continues to step 619 wherein the allocator 501 controls the op-field encoder 503 to place the op-field corresponding to the sixth instruction into the FU1 slot of $LDI_3$ as shown in FIG. 14(B). Then, in step 621, the allocator 501 updates the time stamp identifier corresponding to the resources defined by the sixth instruction, in this case r2, to the increment of the earliest_LDI flag (i.e., earliest_LDI+1), which in this case is 4, as shown in FIG. 16(A). In step 623, because the sixth instruction is not a stopping instruction, operation of the group formatter 123 continues to the next subsequent instruction in sequence (not shown) as described above with respect to the first through sixth instructions.

In addition to the processing steps described above, the allocator 501 in step 619 may set a flag associated with the op-field of the LDI that indicates conditions upon which the function(s) represented by the particular op-field are to be (or not to be) executed. In this case, the execution units of the parallel engine 125 are controlled to execute the functions represented by the corresponding op-field only if the conditions represented by the associated flag have been satisfied.

In the examples described above, for each instruction dispatched for execution to the execution units of the sequential machine, the op-field encoder 503 generates a single op-field corresponding to the instruction that may be executed in a single machine cycle by the functional units and branch processing units of the parallel engine 125. However, the present invention is not limited in this respect. In an alternate embodiment, the op-field corresponding to the instruction may take more than one machine cycle to execute on the functional units and branch processing units of the parallel engine 125. The operation of the allocator 501 in step 621 is modified to update the time stamp identifier corresponding to resources defined by the instruction with the appropriate number of latency units. For example, if the op-field takes 3 machine cycles to execute, the time stamp identifier corresponding to the resources defined by the instruction is updated by 3. Moreover, in an alternate embodiment, the op-field encoder 503 may generate a plurality of op-fields corresponding to a single instruction dispatched for execution by the execution units of the sequential machine. In this case, the operation of the allocator 501 is modified such that the plurality of op-fields corresponding to the instruction are placed into the appropriate LDI(s) in step 619. Furthermore, in an alternate embodiment, one or more functional units of the parallel engine 125 may be capable of executing more than one of the original instructions in a single machine cycle, for example as described in Malik et al., "Interlock Collapsing ALU for Increased Instruction-Level Parallelism", Proceedings of Micro-25, Portland, Oreg., December 1992, pp. 149–157, hereinafter incorporated by reference in its entirety. In this case, the op-field encoder 503 generates a single op-field that corresponds to more than one original instructions, and the operation of the allocator 501 is modified such that the single op-field corresponding to the more than one original instructions is placed into the appropriate LDI in step 619.

Figure 17:
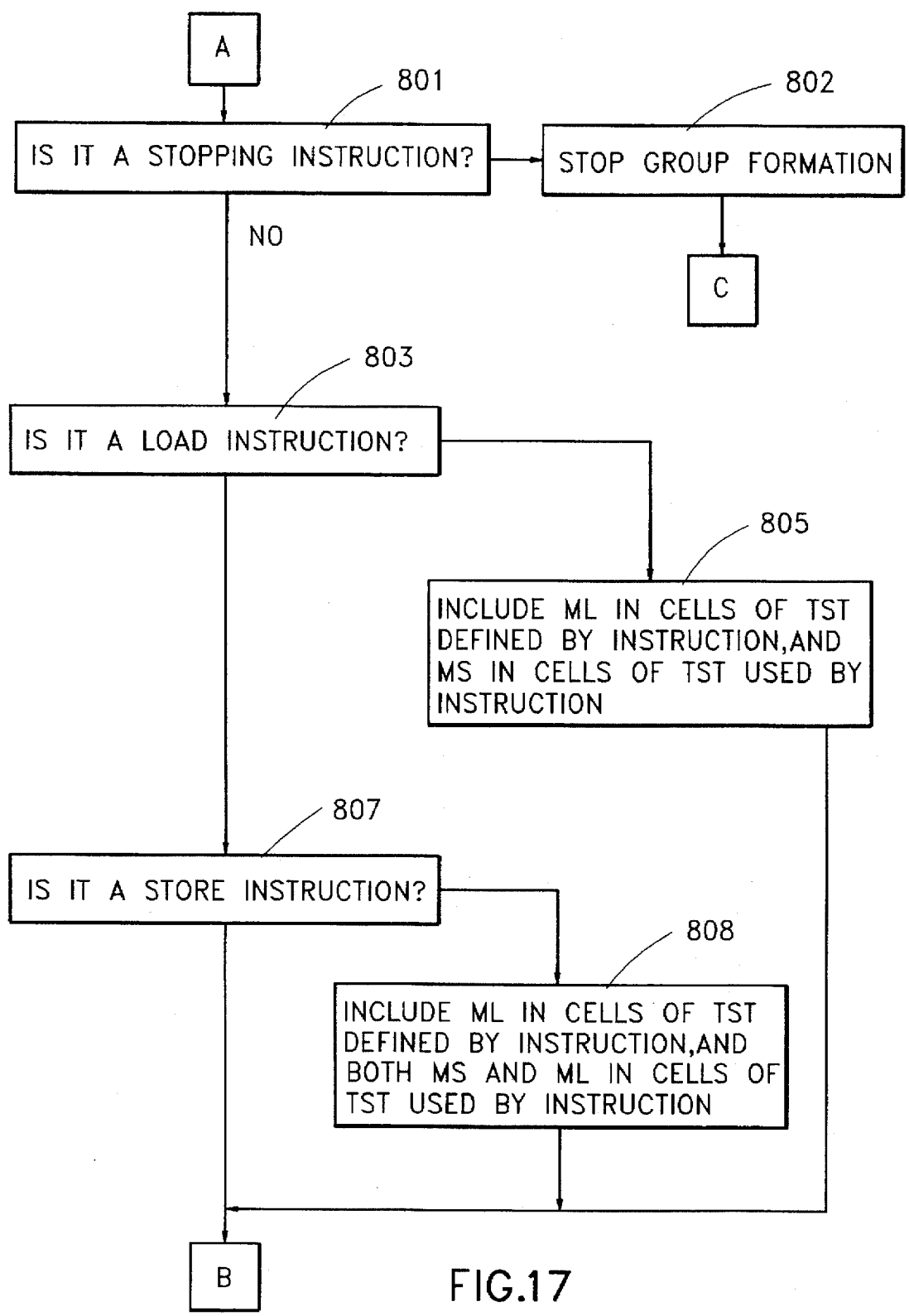
FIG. 17 is a flow chart showing additional operation of the allocator in processing instructions for incorporation into a group of LDIs.

According to a second embodiment of the present invention, the operation of the allocator 501 as described above with respect to the first embodiment may include additional processing steps as illustrated in FIG. 17. More specifically, for each instruction dispatched for execution by the execution units of the sequential machine, the operation of the allocator 501 may include a step 801 wherein the allocator 501 checks whether the particular instruction is a stopping instruction. Here, the stopping instructions may be a predefined subset of the instruction set of the architecture of the sequential machine. Preferably, the predefined subset includes instructions that have high latency, such as a load multiple register instruction or integer divide instruction, and thus would be inefficient to format into the current group, or may not be executable by the parallel engine 125. If in step 801, the allocator 501 determines the instruction is a stopping instruction, the operation of the allocator 501 continues to the steps illustrated in FIG. 13 as discussed above to close the group and write the closed group from the group buffer 507 to the DIB of the parallel engine 125.

Moreover, the group formatter 123 may maintain the ordering of load and store operations such that data is not lost and/or corrupted. This may be accomplished by allocating a cell of the TST 505, designated ML, to memory load operations and a allocating a cell of the TST 505, designated MS, to memory store operations. More particularly, the cell ML stores a time stamp identifier that identifies the LDI of the current group wherein the latest memory load operation of the group, if any, will be completed, and the cell MS stores a time stamp identifier that identifies the LDI of the current group wherein the latest memory store operation of the group, if any, will be completed. In this case, the allocator 501 of the group formatter 123 utilizes the time stamp identifiers stored in cells ML and MS to maintain the order of load and store operations as shown in FIG. 17. In step 803, the allocator 501 checks whether the instruction involved a load operation. If so, operation continues to step 805 wherein the allocator 501 associates the cell ML of the TST 505 to those cells of the TST 505 that correspond to resources defined by the particular instruction, and also associates the cell MS to those cells of the TST 505 that correspond to resources that are used by the particular instruction. After step 805, operation of the allocator 501 continues to step 601 as described above to process the instruction and place it into the appropriate LDI of the current group, if available.

However, if in step 803 the allocator 501 determines the instruction does not involve a load operation, operation continues to step 807 to check whether the instruction involves a store operation. If so, operation continues to step 809 wherein the allocator 501 associates the cell MS of the TST 505 to those cells of the TST 505 that correspond to resources defined by the particular instruction, and also associates the cells MS and ML to those cells of the TST 505 that correspond to resources that are used by the particular instruction. After step 809, operation of the allocator 501 continues to step 601 as described above to process the instruction and place it into the appropriate LDI of the current group, if available.

Finally, if in step 807 the allocator 501 determines the instruction does not involve a store operation, operation continues to step 601 as described above to process the instruction and place it into the appropriate LDI of the current group, if available.

To illustrate the operation of the allocator 501 in maintaining the order of instructions that involve memory load and store operations, consider the following sequence of instructions:

| 1. | Store | r7    | $\Rightarrow$ | 8(r10) |
|----|-------|-------|---------------|--------|
| 2. | Add   | r3,r4 | $\Rightarrow$ | r2     |
| 3. | Load  | 5(r2) | $\Rightarrow$ | r3     |
| 4. | Load  | 7(r6) | $\Rightarrow$ | r9     |
| 5. | Store | r9    | $\Rightarrow$ | 8(r2)  |

FIGS. 18(A) and (B) illustrates the state of the TST 505 and group buffer 507 as the group formatter 123 operates to format this sequence of instructions into a group as described above, for example, with respect to FIGS. 17, 12 and 13.

At the beginning of the group, prior to processing the first instruction, the TST 505 is initialized to have zeros in each cell. For the first instruction, in step 807, the allocator 501 determines the instruction involves a store operation and operation continues to step 809, wherein the allocator 501 associates the cell MS of the TST 505 to those cells of the TST 505 that correspond to resources defined by the first instruction, and also associates the cells MS and ML to those cells of the TST 505 that correspond to resources that are used by the first instruction. Then, because the cells of the TST 505 corresponding to resources used by the first instruction, r7,r10, MS and ML, have a time stamp identifier of 0, the allocator defines $TS_{use}$ (MAX) as 0 in step 603. Furthermore, because the cell of the TST 505 corresponding to resources defined by the instruction, MS, has a time stamp identifier of 0, the allocator defines $TS_{def}$(MAX) as 0 in step 607. In step 609, the allocator 501 sets the earliest_LDI flag to 0, and flow continues to step 613. In step 613, because the earliest_LDI flag, which is now set to zero, is not greater than three, the allocator 501 in step 615 checks whether a slot FU0 . . . FU3 is available in the LDI corresponding to the earliest_LDI flag, in this case $LDI_0$. Because slot FU0 is available in $LDI_0$, operation continues to step 619 wherein the allocator 501 controls the op-field encoder 503 to place the op-field corresponding to the first instruction into the FU0 slot of $LDI_0$ as shown in FIG. 18(B). Then, in step 621, the allocator 501 updates the time stamp identifier of the cells corresponding to the resources defined by the first instruction, in this case MS, to the increment of the earliest_LDI flag (i.e., earliest_LDI+1), which in this case is 1, as shown in FIG. 18(A). In step 623, because the first instruction is not a stopping instruction, operation of the group formatter 123 continues to the second instruction in the sequence.

For the second instruction, because the instruction does not involve a load or store operation, steps 805 and 809 are bypassed and operation continues to step 601. Because the resources used by the instruction, r1 and r5, have a corresponding time stamp identifier of 0, the allocator defines $TS_{use}$ (MAX) as 0 in step 603. Furthermore, because the resource defined by the instruction, r2, has a corresponding time stamp identifier of 0, the allocator defines $TS_{def}$(MAX) as 0 in step 607. In step 609, the allocator 501 sets the earliest_LDI flag to 0, and flow continues to step 613. In step 613, because the earliest_LDI flag, which is now set to 0, is not greater than three, the allocator 501 in step 615 checks whether a slot FU0 . . . FU3 is available in the LDI corresponding to the earliest_LDI flag, in this case $LDI_0$. Because slot FU1 is available in $LDI_0$, operation continues to step 619 wherein the allocator 501 controls the op-field encoder 503 to place the op-field corresponding to the second instruction into the FU0 slot of $LDI_0$ as shown in FIG. 18(B). Then, in step 621, the allocator 501 updates the time stamp identifier of the cells corresponding to the resources defined by the second instruction, in this case r2, to the increment of the earliest_LDI flag (i.e., earliest_LDI+1), which in this case is 1, as shown in FIG. 18(A). In step 623, because the second instruction is not a stopping instruction, operation of the group formatter 123 continues to the third instruction in the sequence.

For the third instruction, in step 803, the allocator 501 determines the instruction involves a load operation and operation continues to step 805, wherein the allocator 501 associates the cell ML of the TST 505 to those cells of the TST 505 that correspond to resources defined by the third instruction, and also associates the cell MS to those cells of the TST 505 that correspond to resources that are used by the third instruction. Then, because the cells of the TST 505 corresponding to resources used by the third instruction, r2,MS, have a time stamp identifier of 1, the allocator 501 defines $TS_{use}$ (MAX) as 1 in step 603. Furthermore, because the cell of the TST 505 corresponding to resources defined by the instruction, r3 and ML, have a time stamp identifier of 0, the allocator 501 defines $TS_{def}$(MAX) as 0 in step 607. In step 609, the allocator 501 sets the earliest_LDI flag to $TS_{use}$ (MAX), which is equal to 1, and flow continues to step 613. In step 613, because the earliest_LDI flag, which is now set to zero, is not greater than three, the allocator 501 in step 615 checks whether a slot FU0 . . . FU3 is available in the LDI corresponding to the earliest_LDI flag, in this case $LDI_1$. Because slot FU0 is available in $LDI_1$, operation continues to step 619 wherein the allocator 501 controls the op-field encoder 503 to place the op-field corresponding to the third instruction into the FU0 slot of $LDI_1$ as shown in FIG. 18(B). Then, in step 621, the allocator 501 updates the time stamp identifier of the cells corresponding to the resources defined by the third instruction, in this case r3 and ML, to the increment of the earliest_LDI flag (i.e., earliest_LDI+1), which in this case is 2, as shown in FIG. 18(A). In step 623, because the third instruction is not a stopping instruction, operation of the group formatter 123 continues to the fourth instruction in the sequence.

For the fourth instruction, in step 803, the allocator 501 determines the instruction involves a load operation and operation continues to step 805, wherein the allocator 501 associates the cell ML of the TST 505 to those cells of the TST 505 that correspond to resources defined by the fourth instruction, and also associates the cell MS to those cells of the TST 505 that correspond to resources that are used by the fourth instruction. Then, because the cells of the TST 505 corresponding to resources used by the instruction, r6,MS, have a time stamp identifier of 0 and 1, respectively, the allocator defines $TS_{use}$ (MAX) as 1 in step 603. Furthermore, because the cell of the TST 505 corresponding to resources defined by the instruction, r9 and ML, have a time stamp identifier of 0 and 2, respectively, the allocator defines $TS_{def}$ (MAX) as 2 in step 607. In step 609, the allocator 501 sets the earliest_LDI flag to $TS_{def}$ (MAX), which is equal to 2, and flow continues to step 613. In step 613, because the earliest_LDI flag, which is now set to 2, is not greater than three, the allocator 501 in step 615 checks whether a slot FU0 . . . FU3 is available in the LDI corresponding to the earliest_LDI flag, in this case $LDI_2$. Because slot FU0 is available in $LDI_2$, operation continues to step 619 wherein the allocator 501 controls the op-field encoder 503 to place the op-field corresponding to the fourth instruction into the FU0 slot of $LDI_2$ as shown in FIG. 18(B). Then, in step 621, the allocator 501 updates the time stamp identifier of the cells corresponding to the resources defined by the fourth instruction, in this case r9 and ML, to the increment of the earliest_LDI flag (i.e., earliest_LDI+1), which in this case is 3, as shown in FIG. 18(A). In step 623, because the fourth instruction is not a stopping instruction, operation of the group formatter 123 continues to the fourth instruction in the sequence.

For the fifth instruction, in step 807, the allocator 501 determines the instruction involves a store operation and operation continues to step 809, wherein the allocator 501 associates the cell MS of the TST 505 to those cells of the TST 505 that correspond to resources defined by the fifth instruction, and also associates the cells ML and MS to those cells of the TST 505 that correspond to resources that are used by the fifth instruction. Then, because the cells of the TST 505 corresponding to resources used by the fifth instruction, r2,r9,ML,MS, have a time stamp identifier of 1,3,3,1, respectively, the allocator defines $TS_{use}$ (MAX) as 2 in step 603. Furthermore, because the cells of the TST 505 corresponding to resources defined by the instruction, MS, has a time stamp identifier of 1, the allocator 501 defines $TS_{def}$(MAX) as 1 in step 607. In step 609, the allocator 501 sets the earliest_LDI flag to $TS_{use}$ (MAX), which is equal to 3, and flow continues to step 613. In step 613, because the earliest_LDI flag, which is now set to 3, is not greater than three, the allocator 501 in step 615 checks whether a slot FU0 ... FU3 is available in the LDI corresponding to the earliest_LDI flag, in this case $LDI_3$. Because slot FU0 is available in $LDI_3$, operation continues to step 619 wherein the allocator 501 controls the op-field encoder 503 to place the op-field corresponding to the fifth instruction into the FU0 slot of $LDI_3$ as shown in FIG. 18(B). Then, in step 621, the allocator 501 updates the time stamp identifier of the cells corresponding to the resources defined by the fifth instruction, in this case MS, to the increment of the earliest_LDI flag (i.e., earliest_LDI+1), which in this case is 4, as shown in FIG. 18(A). In step 623, because the fifth instruction is not a stopping instruction, operation of the group formatter 123 continues to the next instruction in the sequence.

Moreover, it is not imperative that the group formatter 123 maintain the order of load instructions. For example, it may be more efficient to place a load instruction in an earlier LDI than other load instructions. To do so, the operation of the allocator 501 as described is modified such that steps 605-609 are bypassed for load instructions, thus the operation of the allocator 501 continues directly from step 603 to 611 for load instructions. In this case, the state of the TST 505 and group buffer 507 as the group formatter 123 operates to format this sequence of instructions into a group is illustrated in FIGS. 18(C) and (D). Moreover, the technique of utilizing the ML and MS cells of the TST 505 as described above to maintain the order of load and store operations may be extended to other operations, for example move special purpose register operations.

According to a third embodiment of the present invention, the operation of the group formatter 123 may be modified such that it is linked to the execution results of the groups generated by the functional units and/or branch processing units of the parallel engine 125. More specifically, upon experiencing a branch out of a current group stored in the CGB 204, the group formatter 123 may be controlled to modify the current group stored in the CGB 204, instead of beginning to form a new group.

To illustrate this feature, consider the group formatted by the group formatter 123 as discussed above with respect to FIG. 10(A), and subsequently executed by the functional units and/or branch processing units of the parallel engine 125. Assume, for example, that when $LDI_1$ is executed, the conditions indicate x=1 and a branch out of the group occurs to label LK. At this point, rather than start a new group, the existing group is loaded into the group formatter 123 and enhanced as shown in FIG. 19. First, the branch out of the group in $LDI_1$ is eliminated, and instruction k is placed in the earliest possible LDI, in this case the FU3 slot of $LDI_0$. Because the next instruction l depends upon instruction k, instruction l is placed in an available slot, in this case FU2, in $LDI_1$. Because the next instruction m depends upon e and k, instruction m is placed in an available slot, in this case FU3, in $LDI_2$. The next instruction n does not depend upon any instruction, however all the slots of $LDI_0$ and $LDI_1$ are used, therefore, instruction n is placed in an available slot, FU3, in $LDI_2$. Because the next instruction o is dependent upon n, instruction o is placed in an available slot, in this case, FU1, in $LDI_2$. Operation of the group formatter 123 then continues to the next instruction in the sequence which is fetched from the memory system 107 and dispatched by the dispatch unit 115 for execution by the execution units of the sequential machine.

To accomplish this, during formatting, when a branch is encountered, the group formatter 123 encodes the branch instruction and stores the encoded branch instruction along with the current state of the TST 505 into the slot of the LDI allocated to the branch instruction, for example BP0 or BP1. Thus, each BP slot is wide because it incorporates a lot of information. Then, when the group is subsequently executed by the functional units and/or branch processing units of the parallel engine 125, if the branch instruction is resolved to take a path different than the path encoded by the group formatter 123, the current group of LDIs stored in the CGB 204 and the state of the TST encoded with the branch instruction are loaded into the group formatter 123 for subsequent processing as described above.

Moreover, if register renaming techniques are utilized as described above, when a branch is encountered, the group formatter 123 stores the current state of the renaming information, along with the encoded branch instruction and current state of the TST 505, into the slot of the LDI allocated to the branch instruction. Then, when the group is subsequently executed by the functional units and/or branch processing units of the parallel engine, if the branch instruction is resolved to take a path different than the path encoded by the group formatter 123, the current group of LDIs stored in the CGB 204 and the state of the TST and state of the renaming information encoded with the branch instruction are loaded into the group formatter 123 for subsequent processing.

Figure 20:
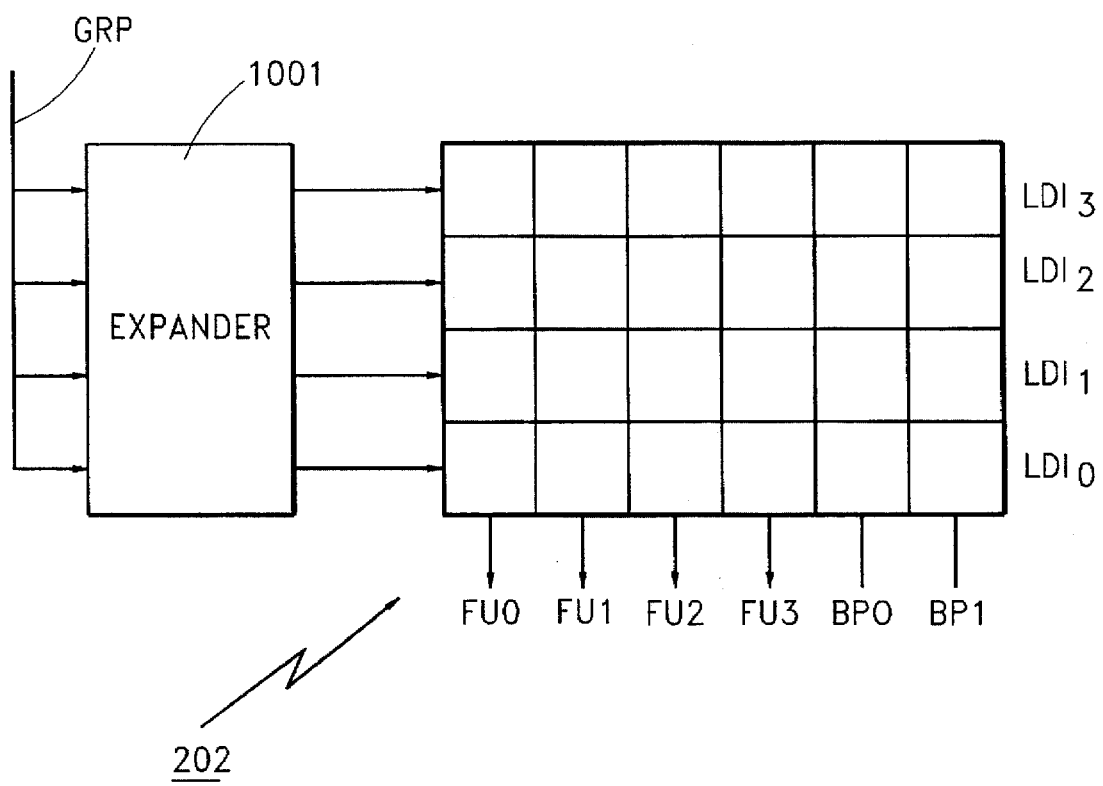
FIG. 20 is a functional block diagram of the current group buffer of FIG. 2 capable of expanding compressed LDIs for execution by the execution units of the parallel engine.

According to a fourth embodiment of the present invention, the LDIs generated by the group formatter 123 and stored in the DIB may be compressed. The compression operation may be performed by the op-field encoder 503, wherein each op-field is compressed individually and then inserted into an LDI of a group, and the group written to the DIB. In the alternative, the compression may be performed on each LDI or performed on the group as a whole, for example, when the group is written to the DIB. In this case, when the control unit 202 of FIG. 2 receives a DIB hit signal (i.e., the next instruction in the sequence is part of a group stored in the DIB), the compressed LDIs output from the DIB must be expanded into LDIs before executing the LDIs of the group as described above with respect to the first embodiment. In order to accomplish this, the current group buffer of FIG. 7 as described above may be modified as shown in FIG. 20.

More specifically, the CGB 204 may include an expander 1001 that receives the compressed LDIs (CLDIs) output from the DIB. For example, the expander 1001 may receive $CLDI_0, CLDI_1, CLDI_2, CLDI_3$ from the DIB. Preferably, when the control unit 202 of the parallel engine 125 receives a DIB hit signal, in the same machine cycle the expander 1001 loads the CLDIs output from the DIB and expands the first CLDI of the group, $CLDI_0$, into an LDI and writes the LDI as $LDI_0$ in the CGB 204. In the next cycle, the functional units and branch processing units of the parallel engine 125 execute the functions specified by the op-fields of $LDI_0$ as described above with respect to the first embodiment. While this is proceeding, the expander 1001 expands the remaining CLDIs ($CLDI_1, CLDI_2, CLDI_3$) into LDIs and writes the LDIs ($LDI_1, LDI_2, LDI_3$) the CGB 204. In the next cycle, operation continues to the next LDI in the group, to another LDI in the group or to an instruction outside the group depending upon the results of the parallel engine in performing the functions specified by the op-fields of $LDI_0$ as described above with respect to the first embodiment.

In an alternate embodiment, to minimize the group execution time, the compression operation performed by the group formatter 123 as described above may be disabled for the first LDI of the group, $LDI_0$.

In the embodiments described above, after the execution units of the parallel engine 125 have finished execution of the operations encoded by the op-fields of the LDIs stored in the CGB 204, the execution results must be put away to the appropriate resources. When the parallel engine 125 does not utilize register renaming, the execution units may put away the execution results to the appropriate resources after every LDI. However, when the parallel engine 125 utilizes register renaming, the execution units must put away execution results when the parallel engine 123 experiences a branch out of a group or when experiencing the end of a group. In this case, the put away operation involves transferring the execution results stored in renamed resources to the original allocated resource according to the rename flags, if need be.

Furthermore, there are often situations (e.g., page faults) when the flow of execution needs to be interrupted in order for a some event to be handled in a special way. These situations are referred to as interrupts or exceptions. In many cases, it is important for the system to know precisely the state of the machine when the exception occurred. This becomes difficult when instructions are allowed to execute out-of-order as in the present invention.

To deal with these requirements, the parallel engine 125 of the present invention preferably commits the results of operations, whether the operations are register write operations or memory store operations, to the architected registers only when the execution of the group is completed. when an exception occurs within the group, the results of instructions executed, but not committed, are discarded, such that the state of the machine is precisely that when the group was entered. The address of the current group is now used to fetch instructions and execute, one-at-a-time, in the sequential machine until the point of exception is reached again. After the exception is handled, execution of the parallel engine 125 resumes at the instruction after the one causing the exception if there is a hit in the DIB, or in the sequential mode otherwise.

As can be seen from the foregoing description, by maintaining a history of execution, a short pipeline with a short cycle time could be used to execute instructions which are encountered more than once. In addition, if the identity of those instructions that can be executed in parallel is also maintained the first time these instructions are encountered, these same instructions can be executed in parallel every subsequent time if adequate functional units are available for their execution.

The logic for decoding and determining the instructions that may be executed in parallel need not be complex since they can be done in multiple cycles on a pipeline which has more stages than the one mentioned. The expectation, and indeed the observation in practice, is that the cost of performing this operation using multiple cycles is more than recovered from the repeated execution of these same instructions in parallel and on a shorter pipeline.

In comparison with previously proposed schemes such as predecoded instruction caches, this scheme has several advantages. First, there is almost no wasted work because the DIB contains only those instructions which were actually encountered during execution of the program, whereas predecoded instruction caches need to anticipate the execution path even the first time an instruction is encountered. Second, there is no additional cost in merging instructions across taken branches. Third, multiple branch paths can be merged dynamically into the decoded instruction group without requiring to wait for instructions from these paths to be fetched possibly from the next level of memory. Fourth, the encoding mechanism dynamically adjusts to actual latencies, rather than expected latencies. Fifth, the scheme works well with an existing instruction set architecture and does not depend on recompilation.

In comparison with traditional superscalar schemes this scheme has several advantages. First, the complexity of the dispatch and decode logic is greatly reduced by doing these operations in multiple cycles. Second, for the same reason, the cycle time of the processor is smaller. Third, better utilization can be made of the functional units by merging operations from several paths through the code, rather than only one expected path through the code. Fourth, the need for branch prediction and branch history tables is eliminated by folding all this information into the instruction stream history.

In comparison with a VLIW machine this scheme has the following advantages. First, it works with any existing instruction set architecture and does not need a new instruction set to be defined. Second, the number of functional units and the internal encoding in the DIB may be changed to suit technology capabilities/limitations and/or processor cost limitations, without affecting the compiled code.

While the invention has been shown and described with reference to particular embodiments thereof, it will be understood by those skilled in the art that the foregoing and other changes in form and detail may be made therein without departing from the spirit and scope of the invention.

We claim:

1. A computer processing apparatus comprising:
   a first processing engine comprising:
      a first memory for storing instructions to be executed by at least one first execution unit,
      an instruction fetch unit for fetching instructions from said first memory into an instruction queue according to a fetch control signal,
      a dispatch unit for dispatching instructions stored in said instruction queue for execution by said at least one first execution unit, and
      means for updating said fetch control signal according to execution of instructions performed by said at least one first execution unit;
   alternate encoding execution means comprising a plurality of second execution units;
   a group formatter for generating an alternate encoding of sequences of instructions dispatched for execution by said dispatch unit concurrent with execution of said sequences of instructions by said first processing engine, wherein said alternate encoding comprises a set of long decoded instructions, wherein each long decoded instruction (LDI) comprises a set of op-fields each corresponding to one of said plurality of second execution units, and wherein each op-field is executable by the corresponding second execution unit;
   a second memory for storing said alternate encoding generated by said group formatter; and
   wherein, upon detecting that said fetch control signal corresponds to said alternate encoding stored in said second memory, said plurality of second execution units execute said alternate encoding stored in said second memory.

2. The computer processing apparatus of claim 1, wherein said group formatter generates said alternate encoding subsequent to execution of said sequences of instructions by said execution unit of said first processing engine.

3. The computer processing apparatus of claim 1, wherein said alternate encoding generated by said group formatter is suitable for parallel execution.

4. The computer processing apparatus of claim 1, wherein at least one of said second execution units of said alternate encoding execution means is different from said first execution unit of said first processing engine.

5. The computer processing apparatus of claim 1, wherein one of said plurality of second execution units of said alternate encoding execution means comprises said first execution unit of said first processing engine.

6. The computer processing apparatus of claim 1 wherein each op-field may be executed by the corresponding second execution unit of said alternate encoding execution means in a single machine cycle.

7. The computer processing apparatus of claim 1,
wherein said alternate encoding execution means comprises a plurality of register resources that said op-fields may use and/or define, and wherein said group formatter comprises:
a op-field encoder that generates said op-fields according to said sequences of instructions dispatched for execution by said dispatch unit;
a time stamp table for storing time stamp identifiers associated with each of said register resources, wherein said time stamp identifiers identify on which LDI of said set of long decoded instructions the associated register resource will be available; and
an allocator that builds said set of long decoded instructions according to dependency between instructions within said sequences of instructions, time stamp identifiers stored in said time stamp table, and said op-fields generated by said op-field encoder.

8. The computer processing apparatus of claim 7, wherein said allocator builds said set of long decoded instructions according to latency of instructions within said sequences of instructions.

9. The computer processing apparatus of claim 7, wherein said allocator closes said set of long decoded instructions upon detecting that one instruction within said sequences of instructions corresponds to a predefined stopping instruction.

10. The computer processing apparatus of claim 7, wherein, upon detecting that one instruction of said sequences of instructions defines a resource previously defined by an op-field of a current group, said allocator renames said resource to a free resource.

11. The computer processing apparatus of claim 7,
wherein said time stamp table includes time stamp identifiers associated with load and store operations, respectively, and
wherein said allocator utilizes said time stamp identifiers associated with load and store operations to maintain order of said load and store operations.

12. The computer processing apparatus of claim 1, wherein said second memory comprises:
an array of entries each including a set of long decoded instructions;
means for determining if one entry of said array of entries corresponds to said fetch control signal;
means for reading out a set of long decoded instructions of said one entry upon determining that said one entry corresponds to said fetch control signal; and
wherein said alternate encoding execution means comprises:
a buffer for storing said set of long decoded instructions read out from said second memory, and
said plurality of second execution units execute said op-fields of said set of long decoded instructions stored in said buffer.

13. The computer processing apparatus of claim 12, wherein said alternate encoding execution means further comprises means for updating said fetch control signal according to execution results of said op-fields.

14. The computer processing apparatus of claim 12, wherein said plurality of second execution units put away execution results of said op-fields of each LDI to appropriate register resources after finishing execution of each LDI.

15. The computer processing apparatus of claim 12, wherein said plurality of second execution units put away execution results of said op-fields of said set of long decoded instructions after finishing execution of said set of long decoded instructions.

16. The computer processing apparatus of claim 12, further comprising an exception controller that, upon experiencing an exception,
updates said fetch control signal to correspond to a first instruction encoded within said set of long decoded instructions stored in said buffer,
updates register resources associated with said first processing engine to their original state prior to said first instruction, and
enables said first processing engine to begin processing said first instruction.

17. The computer processing apparatus of claim 12,
wherein one or more of said long decoded instructions stored in said second memory are compressed; and
wherein said alternate encoding execution means includes means for expanding each long decoded instruction which is compressed prior to execution.

18. The computer processing apparatus of claim 12, further comprising means for loading said set of long decode instructions currently stored in said buffer into said group formatter for subsequent processing upon detecting that one of said op-fields of said set of long decoded instructions stored in said buffer is resolved as a branch instruction out of said set of long decoded instructions stored in said buffer.

19. The computer processing apparatus of claim 1, wherein at least one sequence S of said sequences of instructions comprises a branch instruction B, an instruction PB preceding said branch instruction B, and an instruction FB following said branch instruction B, and wherein said set of long decoded instructions corresponding to said sequence S includes op-fields corresponding to said branch instruction B, said instruction PB and said instruction FB.

20. The computer processing apparatus of claim 19, wherein position of one of said instruction PB and said instruction FB in said sequence of instructions is not adjacent to said branch instruction B.

21. The computer processing apparatus of claim 19, wherein said instruction FB is determined based upon execution results of said branch instruction B.

22. The computer processing apparatus of claim 19, wherein said sequence S comprises multiple branch instructions, and wherein said set of long decoded instructions corresponding to said sequence S includes op-fields corresponding to each of said multiple branch instructions.

23. The computer processing apparatus of claim 22, wherein said sequence S is determined based upon execution results of said multiple branch instructions.

24. In a computer processing system wherein instuctions are stored in a first memory, a method of executing said instructions comprising the steps of:

fetching instructions from said first memory into an instruction queue according to a fetch control signal;

dispatching instructions stored in said instruction queue for execution by at least one first execution unit;

updating said fetch control signal according to execution of instructions performed by said at least one first execution unit;

generating an alternate encoding of sequences of instruction dispatched for execution concurrent with execution of said sequences of instructions by said at least one first execution unit, wherein said alternate encoding comprises a set of long decoded instructions, wherein each long decoded instruction (LDI) comprises a set of op-fields each corresponding to one of a plurality of second execution units, and wherein each op-field is executable by the corresponding second execution unit;

storing said alternate encoding generated by said group formatter in a second memory; and controlling said plurality of second execution units to execute said alternate encoding stored in said second memory upon detecting that said fetch control signal corresponds to said alternate encoding stored in said second memory.

25. The method of claim 24, wherein said alternate encodings are generated subsequent to execution of said sequences of instructions by said execution unit.

26. The method of claim 24, wherein said alternate encoding is suitable for parallel execution by said plurality of second execution units.

27. The method of claim 24, wherein each op-field may be executed by the corresponding second execution unit of said alternate encoding execution means in a single machine cycle.

28. The method of claim 24, wherein said computer processing system includes:

a plurality of register resources that said op-fields may use and/or define, an op-field encoder that generates said op-fields according to said sequences of instructions dispatched for execution, and a time stamp table for storing time stamp identifiers associated with each of said register resources, wherein said time stamp identifiers identify on which LDI of said set of long decoded instructions the associated register resource will be available;

the method further comprising the step of:

building said set of long decoded instructions according to dependency between instructions within said sequences of instructions, time stamp identifiers stored in said time stamp table, and said op-fields generated by said op-field encoder.

29. The method of claim 28, wherein said set of long decoded instructions are built according to latency of instructions within said sequences of instructions.

30. The method of claim 28, further comprising the step of:

closing said set of long decoded instructions upon detecting that one instruction within said sequences of instructions corresponds to a predefined stopping instruction.

31. The method of claim 28, further comprising the step of:

upon detecting that one instruction of said sequences of instructions defines a resource previously defined by an op-field of one LDI within said set of long decoded instructions, renaming said resource to a free resource.

32. The method of claim 28, wherein said time stamp table includes time stamp identifiers associated with load and store operations, respectively, further comprising the step of:

maintaining order of said load and store operations according to said time stamp identifiers associated with load and store operations.

33. The method of claim 24, wherein said second memory comprises an array of entries each including a set of long decoded instructions, further comprising the steps of:

determining if one entry of said array of entries corresponds to said fetch control signal;

reading out a set of long decoded instructions of said one entry upon determining that said one entry corresponds to said fetch control signal;

storing said set of long decoded instructions read out from said second memory; and executing said op-fields of said set of long decoded instructions stored in said buffer.

34. The method of claim 33, further comprising the step of:

updating said fetch control signal according to execution results of said op-fields.

35. The method of claim 33, further comprising the step of:

putting away execution results of said op-fields of each LDI to appropriate register resources after finishing execution of each LDI.

36. The method of claim 33, further comprising the step of:

putting away execution results of said op-fields of said set of long decoded instructions after finishing execution of said set of long decoded instructions.

37. The method of claim 33, further comprising the steps of:

upon experiencing an exception, updating said fetch control signal to correspond to a first instruction encoded within said set of long decoded instructions stored in said buffer, updating register resources associated with said at least one execution unit to their original state prior to said first instruction, and enabling processing of said first instruction for execution by said at least one execution unit.

38. The method of claim 33, further comprising the steps of:

prior to storing said one or more of said long decoded instructions in said second memory, compressing said one or more long decoded instructions; and prior to executing said one or more long decoded instructions, expanding each long decoded instruction which is compressed.

39. The method of claim 33, further comprising the step of:

upon detecting that one of said op-fields of said set of long decoded instructions stored in said buffer is resolved as a branch instruction out of said set of long decoded instructions stored in said buffer, updating said set of long decoded instructions currently stored in said buffer.

40. The method of claim 33, wherein said updating of said set of long decoded instructions stored in said buffer includes the step of adding at least one long decoded instruction to said set of long decoded instructions according to said sequences of instructions and dependency between instructions within said sequences of instructions.

41. The method of claim 40, wherein said at least one long decoded instuction is added to said set of long decoded instructions stored in said buffer according to latency of said instuction within said sequences of instuctions.

42. The method of claim 24, wherein at least one sequence S of said sequences of instructions comprises a branch instruction B, an instruction PB preceding said branch instruction, and an instruction FB following said branch instruction, and wherein said set of long decoded instructions corresponding to said sequence S includes op-fields corresponding to said branch instruction B, said instruction PB and said instruction FB.

43. The method of claim 42, wherein position of one of said instruction PB and said instruction FB in said sequence of instructions is not adjacent to said branch instruction B.

44. The method of claim 42, wherein said instruction FB is determined based upon execution results of said branch instruction B.

45. The method of claim 42, wherein said sequence S comprises multiple branch instructions, and wherein said set of long decoded instructions corresponding to said sequence S includes op-fields corresponding to each of said multiple branch instructions.

46. The method of claim 45, wherein said sequence S is determined based upon execution results of said multiple branch instructions.

* * * * *